United States Patent
Kim et al.

(10) Patent No.: US 9,479,407 B2
(45) Date of Patent: Oct. 25, 2016

(54) METHOD AND DEVICE FOR MONITORING DOWNLINK CHANNELS

(71) Applicant: LG ELECTRONICS INC., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 14/384,343

(22) PCT Filed: Apr. 5, 2013

(86) PCT No.: PCT/KR2013/002881
§ 371 (c)(1),
(2) Date: Sep. 10, 2014

(87) PCT Pub. No.: WO2013/151389
PCT Pub. Date: Oct. 10, 2013

(65) Prior Publication Data
US 2015/0043355 A1 Feb. 12, 2015

Related U.S. Application Data

(60) Provisional application No. 61/620,964, filed on Apr. 5, 2012.

(51) Int. Cl.
*H04L 12/26* (2006.01)
*H04J 11/00* (2006.01)
*H04L 1/16* (2006.01)
(Continued)

(52) U.S. Cl.
CPC .............. *H04L 43/08* (2013.01); *H04J 11/00* (2013.01); *H04L 1/1607* (2013.01); *H04L 1/1867* (2013.01); *H04L 1/1812* (2013.01); *H04L 5/0048* (2013.01); *H04L 5/0055* (2013.01); *H04L 5/0073* (2013.01)

(58) Field of Classification Search
CPC .................................. H04J 11/00; H04J 43/08
See application file for complete search history.

(56) References Cited

U.S. PATENT DOCUMENTS

| | | | |
|---|---|---|---|
| 2010/0120442 A1* | 5/2010 | Zhuang | H04B 7/15507 455/450 |
| 2010/0208709 A1* | 8/2010 | Kim | H04B 7/0452 370/336 |
| 2011/0249633 A1 | 10/2011 | Hong et al. | |

(Continued)

FOREIGN PATENT DOCUMENTS

| KR | 10-2009-0083269 A | 8/2009 |
|---|---|---|
| KR | 10-2010-0051528 A | 5/2010 |

(Continued)

*Primary Examiner* — Brian D Nguyen
*Assistant Examiner* — Toan Nguyen
(74) *Attorney, Agent, or Firm* — Birch, Stewart, Kolasch & Birch, LLP

(57) ABSTRACT

Disclosed are a method and a device for monitoring a downlink control channel in a wireless communication system. The method for monitoring a downlink control channel in a wireless communication system may comprise the steps of determining whether a common search space in a subframe exists in a physical downlink control channel (PDCCH) region or in an enhanced physical downlink control channel (ePDCCH) region; and when the common search space exists in the ePDCCH region, monitoring, in the ePDCCH region, a downlink control channel for hybrid automatic repeat request (HARQ) acknowledgement (ACK) or non-acknowledgement (NACK) information.

10 Claims, 36 Drawing Sheets

(51) Int. Cl.
*H04L 1/18* (2006.01)
*H04L 5/00* (2006.01)

(56) References Cited

U.S. PATENT DOCUMENTS

2011/0250918 A1* 10/2011 Jen .................. H04W 52/08
                                                    455/509
2012/0033643 A1   2/2012 Noh et al.
2013/0114521 A1*  5/2013 Frenne ................. H04L 5/0053
                                                    370/329
2013/0252606 A1*  9/2013 Nimbalker ........... H04B 17/309
                                                    455/434

FOREIGN PATENT DOCUMENTS

| KR | 10-2011-0112750 A | 10/2011 |
| WO | WO 2009/041779 A1 | 4/2009 |
| WO | WO 2011/106559 A2 | 9/2011 |

* cited by examiner

FIG. 6
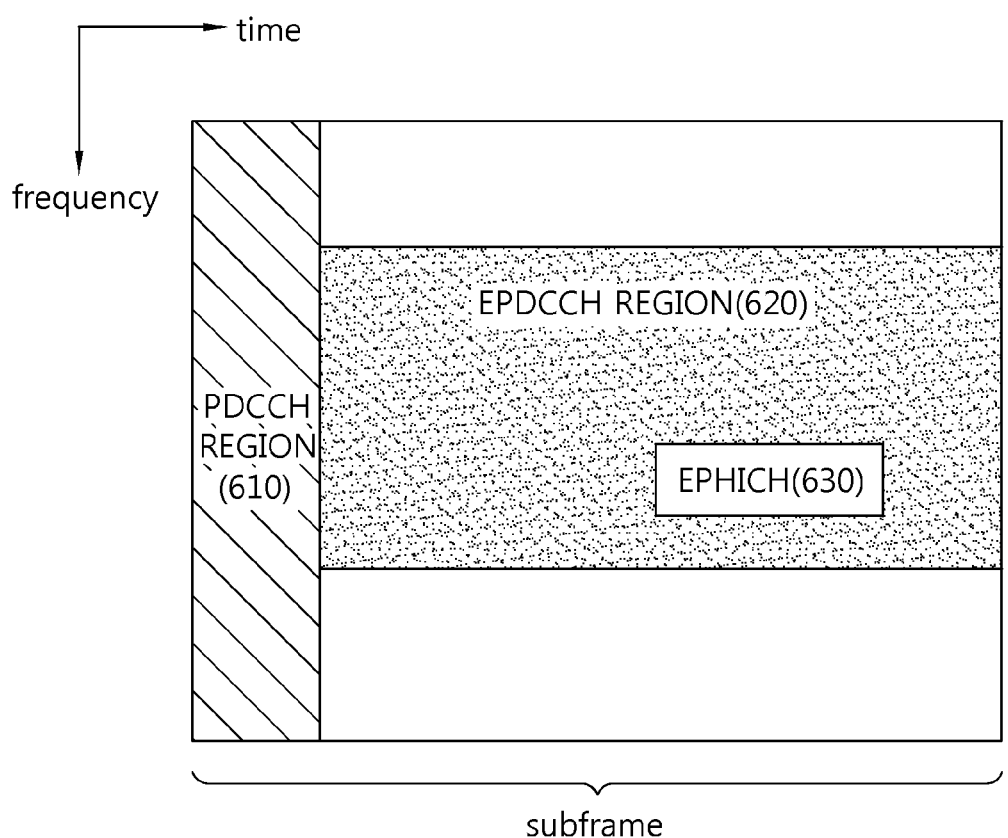
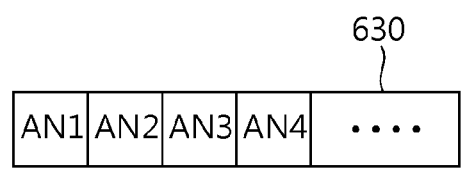

METHOD AND DEVICE FOR MONITORING DOWNLINK CHANNELS

FIELD OF THE INVENTION

The present invention relates to wireless communication, and more particularly, to a method and a device for monitoring downlink channels.

RELATED ART

A physical downlink control channel (PDCCH) is used to transmit downlink control information (DCI) such as scheduling decision and a power control command. The DCI includes designation of a physical downlink shared channel (PDSCH), a transmission format, hybrid automatic retransmit request (HARQ) information, and downlink scheduling assignment including spatial multiplexing related control information. The downlink scheduling assignment may include even a command for power control of a physical uplink control channel (PDCCH) uplink physical channel.

Further, the DCI may include even uplink scheduling approval including the PUSCH resource designation, the transmission format, and the HARQ information. The uplink scheduling approval may include even a command for power control of the PUSCH uplink physical channel. Moreover, even a power control command transmitted to a set of user equipments in order to supplement the power control command included in scheduling assignment/approval may be included in separate DCI.

The PDCCH in the related art is just transmitted by using transmit diversity in a predetermined area and various techniques supported for the PDSCH, which include beamforming, multi user (MU)-multiple-input multiple-output (MIMO), best band selection, and the like are not applied. Further, in the case where a distributed multiple node system is introduced in order to improve system performance, cell identifiers of a plurality of nodes or a plurality of remote radio heads (RRHs) are the same as each other), a capacity of the PDCCH may become short. As a result, a new control channel may be introduced in addition to the existing PDCCH. A control channel newly defined in the following description is referred to as enhanced PDCCH (ePDCCH). The ePDCCH may be a data region, not the existing control region to which the PDCCH is assigned. As the ePDCCH is defined, a control signal for each node may be transmitted for each UE and a problem that the existing PDCCH region may be short may be solved.

SUMMARY OF THE INVENTION

An aspect of the present invention provides a method for monitoring downlink channels.

Another aspect of the present invention provides a device for monitoring downlink channels.

In an aspect, a method for monitoring a downlink control channel in a wireless communication system, includes: determining whether a common search space is present in a physical downlink control channel (PDCCH) region or an enhanced physical downlink control channel (ePDCCH) region; and monitoring, when the common search space is present in the ePDCCH region, a downlink control channel for HARQ (hybrid automatic repeat request) ACK (acknowledgement)/NACK (non-acknowledgement) information in the ePDCCH region, and the common search space is present at a fixed position in the PDCCH region or the ePDCCH region in all subframes, the PDCCH region is a region in which a PDCCH is monitored based on a cell-specific reference signal (CRS) in the subframe, the CRS is a reference signal created based on a cell identifier, the ePDCCH region is a region in which an ePDCCH is monitored based on a demodulation reference signal (DM-RS) in the subframe, the DM-RS is a reference signal created based on a value given by a base station, and the downlink control channel transports the HARQ ACK/NACK information for a plurality of UEs.

In another aspect, a UE for monitoring a downlink control channel in a wireless communication system, includes: a processor, and the processor is implemented to determine whether the common search space is present in the physical downlink control channel (PDCCH) region or the enhanced physical downlink control channel (ePDCCH) region and when the common search space is present in the physical downlink control channel (PDCCH) region, the processor is implemented to monitor the downlink control channel for the HARQ (hybrid automatic repeat request) ACK (acknowledgement)/NACK (non-acknowledgement) information in the ePDCCH region, the common search space is present at a fixed position in the PDCCH region or the ePDCCH region in all subframes, the PDCCH region is a region in which a PDCCH is monitored based on a cell-specific reference signal (CRS) in the subframe, the CRS is a reference signal created based on a cell identifier, the ePDCCH region is a region in which an ePDCCH is monitored based on a demodulation reference signal (DM-RS) in the subframe, the DM-RS is a reference signal created based on a value given by a base station, and the downlink control channel transports the HARQ ACK/NACK information for a plurality of UEs.

Downlink control channels can be effectively monitored.

BRIEF DESCRIPTION OF THE DRAWINGS

FIG. 6 illustrates one example of a subframe including an ePHICH.

DESCRIPTION OF EXEMPLARY EMBODIMENTS

A wireless device may be fixed or movable and may be called other terms such as user equipment (UE), a mobile station (MS), a mobile terminal (MT), a user terminal (UT), a subscriber station (SS), a personal digital assistant (PDA), a wireless modem, a handheld device, and the like. Alternatively, the wireless device may be a device that supports only data communication, such as a machine-type communication (MTC) device.

A base station (BS) generally represents a fixed station that communicates with the wireless device and may be called different terms such as an evolved-NodeB (eNB), a base transceiver system (BTS), an access point, and the like.

Hereinafter, it is described that the present invention is applied based on 3rd Generation Partnership Project (3GPP) long term evolution (LTE) based on 3GPP technical specification (TS) release 8 or 3GPP LTE-A based on 3GPP TS release 10. This is just an example and the present invention may be applied to various wireless communication networks. Hereinafter, LTE includes LTE and/or LTE-A.

Figure 1:
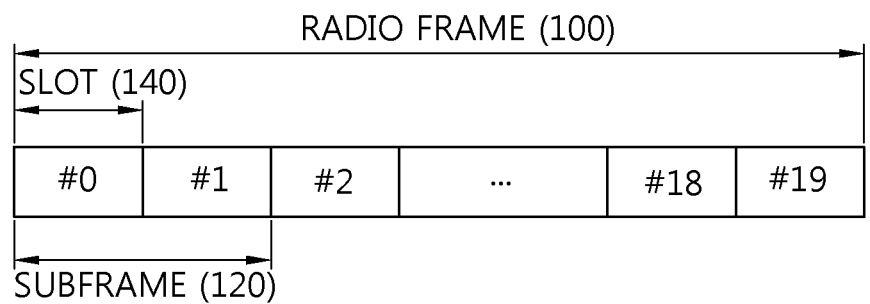
FIG. 1 illustrates the structure of a radio frame in 3rd Generation Partnership Project (3GPP) long term evolution (LTE).

FIG. 1 illustrates the structure of a radio frame in 3rd Generation Partnership Project (3GPP) long term evolution (LTE).

The structure of the radio frame 10 in the 3GPP LTE may refer to Clause 5 of 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame 100 is constituted by 10 subframes, and one subframe 120 is constituted by two slots 140. In the radio frame 100, an index may be applied according to the slot 140 of slots #0 to #19 or the index may be applied according to the subframe 120 of subframes #0 to #9. Subframe #0 may include slot #0 and slot #1.

A time required to transmit one subframe 120 is referred to as a transmission time interval (TTI). The TTI may be a scheduling unit for data transmission. For example, the length of one radio subframe may be 10 ms, the length of one subframe may be 1 ms, and the length of one slot may be 0.5 ms.

One slot includes a plurality of orthogonal frequency division multiplexing (OFDM) symbols in a time domain, and a plurality of subcarriers in a frequency domain. Since the 3GPP LTE uses the OFDMA in the downlink, the OFDM symbol is used to express one symbol period and may be called other name according to a multiple access scheme. For example, when a single carrier-frequency division multiple access (SC-FDMA) is used as an uplink multiple access scheme, the OFDM symbol may be called an SC-FDMA symbol. A resource block (RB) includes a plurality of contiguous subcarriers in one slot as a resource allocation unit. The resource block will be disclosed in detail in FIG. 2. The structure of the radio frame 100 disclosed in FIG. 1 is one embodiment for a frame structure. Accordingly, the number of subframes 120 included in the radio frame 100, the number of slots 140 included in the subframe 120, or the number of OFDM symbols included in the slot 140 is diversifiedly changed to be defined as a new radio frame format.

The 3GPP LTE defines that one slot includes 7 OFDM symbols when a normal cyclic prefix (CP) is used, and one slot includes 7 OFDM symbols when an extended CP is used.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be advantageously acquired from the uplink channel response. In the TDD scheme, since an entire frequency bands are time-divided into the uplink transmission and the downlink transmission, the downlink transmission by the base station and the uplink transmission by the user equipment may not simultaneously be performed. In the TDD system in which the uplink transmission and the downlink transmission are divided by the unit of the subframe, the uplink transmission and the downlink transmission are performed in different subframes.

Figure 2:
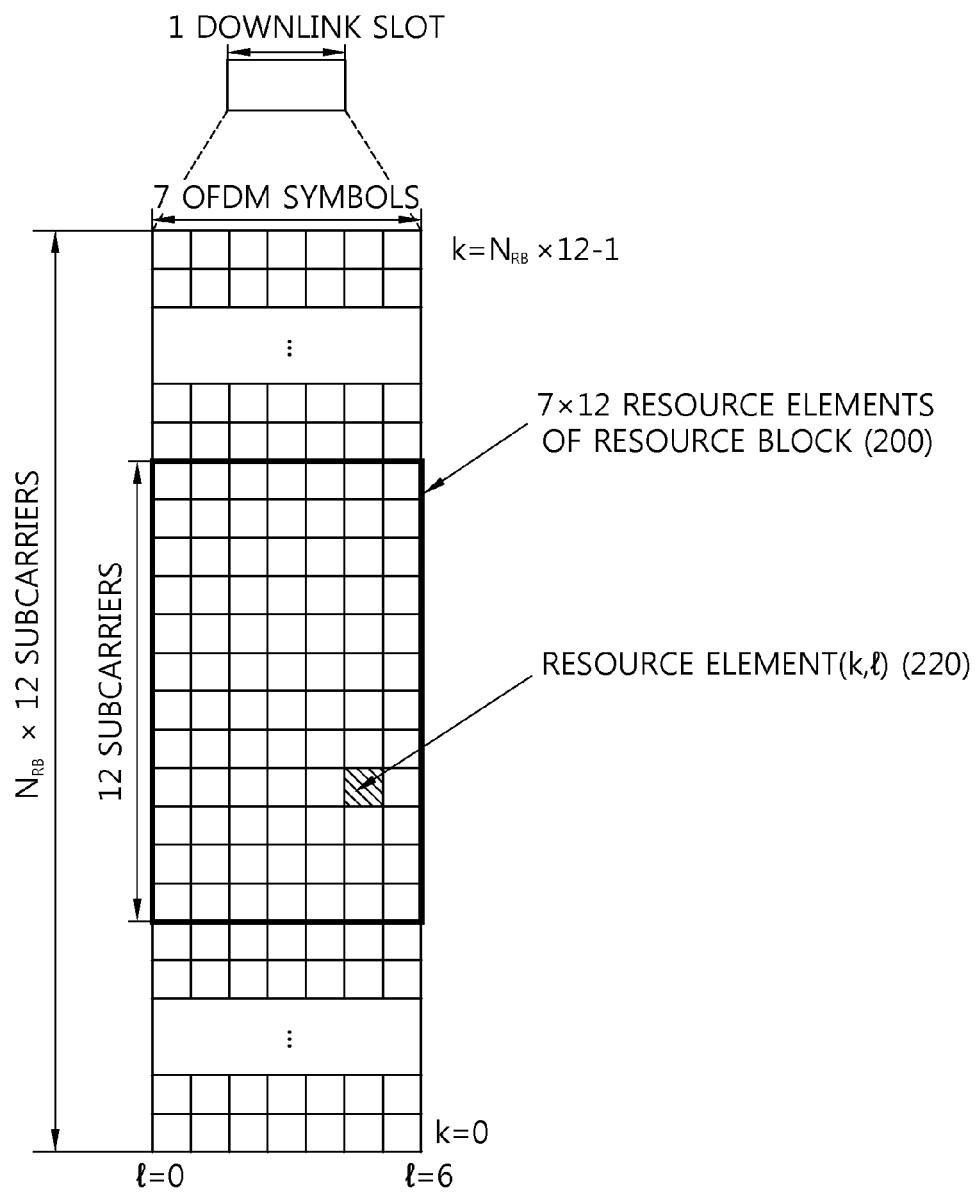
FIG. 2 illustrates one example of a resource grid for a downlink slot.

FIG. 2 illustrates one example of a resource grid for a downlink slot.

The downlink slot includes a plurality of OFDM symbols in the time domain, and includes NRB resource blocks in the frequency domain. NRB which is the number of resource blocks included in the downlink slot is subordinate to a downlink transmission bandwidth set in a cell. For example, in an LTE system, the NRB may be any one of 6 to 110 according to the used transmission bandwidth. One resource block 200 includes a plurality of subcarriers in the frequency domain. The structure of an uplink slot may also be the same as that of the downlink slot.

Each element on the resource grid is called a resource element 220. The resource element on the resource grid may be identified by a pair of indexes (k,l) in the slot. Herein, k (k=0, . . . , NRB×12-1) represents a subcarrier index in the frequency domain, and l (l=0, . . . , 6) represents an OFDM symbol index in the time domain.

Herein, it is exemplified that one resource block 200 is 7×12 resource elements 220 which are constituted by 7 OFDM symbols in the time domain and 12 subcarriers in the frequency domain, but the number of the OFDM symbols and the number of the subcarriers in the resource block 220 are not limited thereto. The number of the OFDM symbols and the number of the subcarriers may be variously changed depending on the length of the CP, frequency spacing, and the like. For example, in the case of a normal CP, the number of OFDM symbols is 7 and in the case of an extended CP, the number of OFDM symbols is 6. As the number of subcarriers in one OFDM symbol, one of 128, 256, 512, 1024, 1536, and 2048 may be selected and used.

A unit in which four resource elements are gathered in the unit of the resource may be referred to as a resource element group (REG). The CCE represents a unit in which 9 REGs are gathered. That is, one CCE may include 26 available REs.

Figure 3:
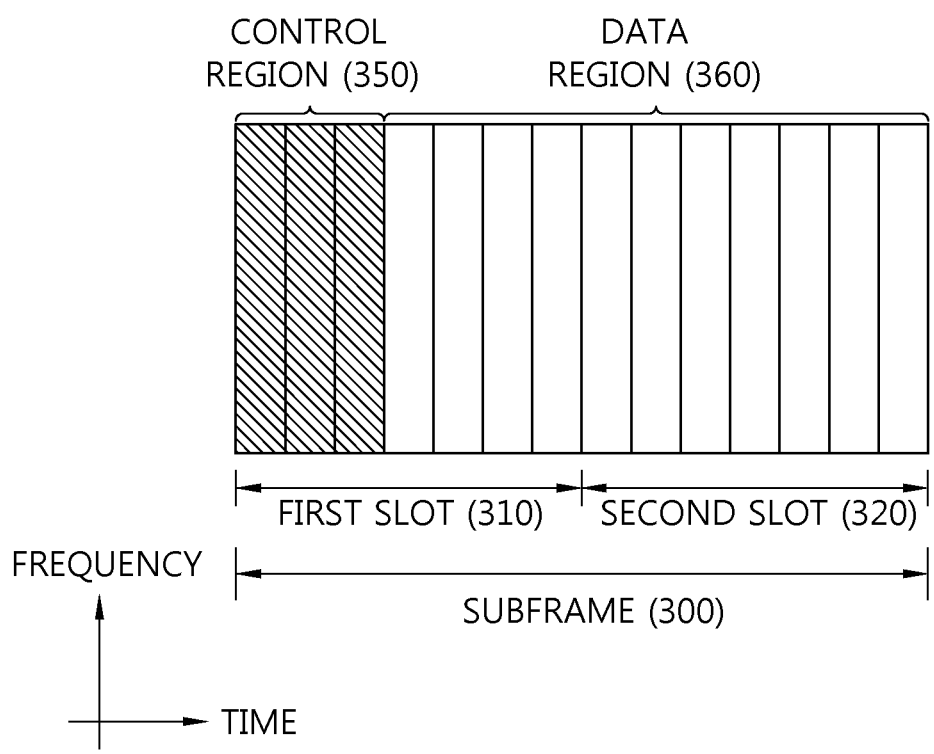
FIG. 3 illustrates the structure of a downlink subframe.

FIG. 3 illustrates the structure of a downlink subframe.

The downlink subframe 300 includes two slots 310 and 320 in the time domain and each of the slots 310 and 320 includes 7 OFDM symbols in the normal CP. Preceding maximum 3 OFDM symbols (maximum 4 OFDM symbols for a 1.4 Mhz bandwidth) of a first slot 310 in the subframe 300 are a control region 350 to which control channels are allocated, and residual OFDM symbols become a data region 360 to which a physical downlink shared channel (PDSCH) is allocated.

A PUCCH may carry resource allocation and a transmission format of a downlink-shared channel (DL-SCH), resource allocation information of an uplink shared channel (UL-SCH), paging information on a PCH, system information on the DL-SCH, resource allocation of an upper layer control message such as a random access response transmitted on the PDSCH, a set of transmission power control commands for individual UEs in a predetermined UE group, and activation of voice over Internet protocol (VoIP). A plurality of PDCCH regions may be transmitted in the control region 350, and the user equipment may monitor the plurality of PDCCHs. The PDCCH is transmitted on aggregation of one or several contiguous control channel elements (CCEs). The CCE is a logical allocation unit used to provide to the coding rate to the PDCCH depending on a state of a radio channel. The CCEs correspond to a plurality of resource element groups. A format of the PDCCH and the bit number of an available PDCCH are determined according to a correlation of the number of CCEs and the coding rate provided by the CCEs.

The base station determines the PDCCH format according to the downlink control information (DCI) to be sent to the terminal and affixes a cyclic redundancy check (CRC) to the control information. A unique identifier (radio network temporary identifier (RNTI)) is masked on the CRC according to an owner or a purpose of the PDCCH. In the case of a PDCCH for a specific UE, a unique identifier of the UE, for example, a cell (C)-RNTI may be masked on the CRC. Alternatively, in the case of a PDCCH for a paging message, a paging indication identifier, for example, a paging (P)-RNTI may be masked on the CRC. In the case of a PDCCH for a system information block (SIB), a system information (SI)-RNTI may be masked on the CRC. A random access (RA)-RNTI may be masked on the CRC in order to indicate the random access response which is a response to transmission of a random access preamble of the UE.

Figure 4:
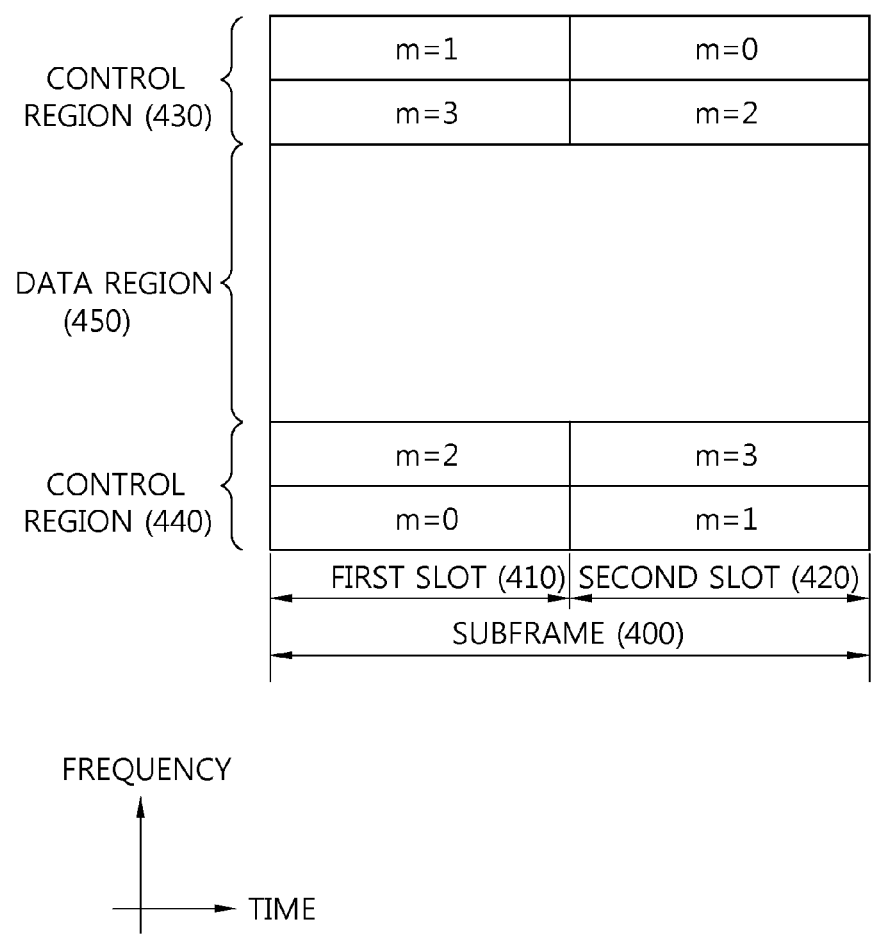
FIG. 4 illustrates a structure of an uplink subframe.

FIG. 4 shows a structure of an uplink subframe.

The uplink subframe may be divided into control regions 430 and 440 and a data region 450 in the frequency domain. A physical uplink control channel (PUCCH) for transmitting the uplink control information is allocated to the control regions 430 and 440. A physical uplink shared channel (PUSCH) for transmitting data is allocated to the data region 450. When indicated in a higher layer, the user equipment may support simultaneous transmission of the PUSCH and the PUCCH.

A PUCCH for one user equipment is allocated to a resource block (RB) pair in the subframe 400. Resource blocks that belong to the RB pair occupy different subcarriers in first and second slots 410 and 420, respectively. A frequency occupied by the resource blocks that belongs to the RB pair allocated to the PUCCH is changed based on a slot boundary. This means that the RB pair allocated to the PUCCH is frequency-hopped on the slot boundary. The user equipment transmits the uplink control information through different subcarriers with time to acquire a frequency diversity gain. m is a position index representing a logical frequency domain position of the resource block pair allocated to the PUCCH in the subframe.

The uplink control information transmitted on the PUCCH includes a hybrid automatic repeat request (HARQ) acknowledgement (ACK)/non-acknowledgement (NACK), a channel quality indicator (CQI) indicating a downlink channel status, a scheduling request (SR) which is an uplink radio resource allocation request, and the like.

The PUSCH is mapped in the uplink shared channel (UL-SCH) which is a transport channel. Uplink data transmitted on the PUSCH may be a transport block which is a data block for the UL-SCH transmitted during the TTI. The transport block may be user information. Alternatively, the uplink data may be multiplexed data. The multiplexed data may be acquired by multiplexing the transport block for the UL-SCH and the control information. For example, the control information multiplexed to the data may include a CQI, a precoding matrix indicator (PMI), HARQ, a rank indicator (RI), and the like. Alternatively, the uplink data may be constituted by only the control information.

Figure 5:
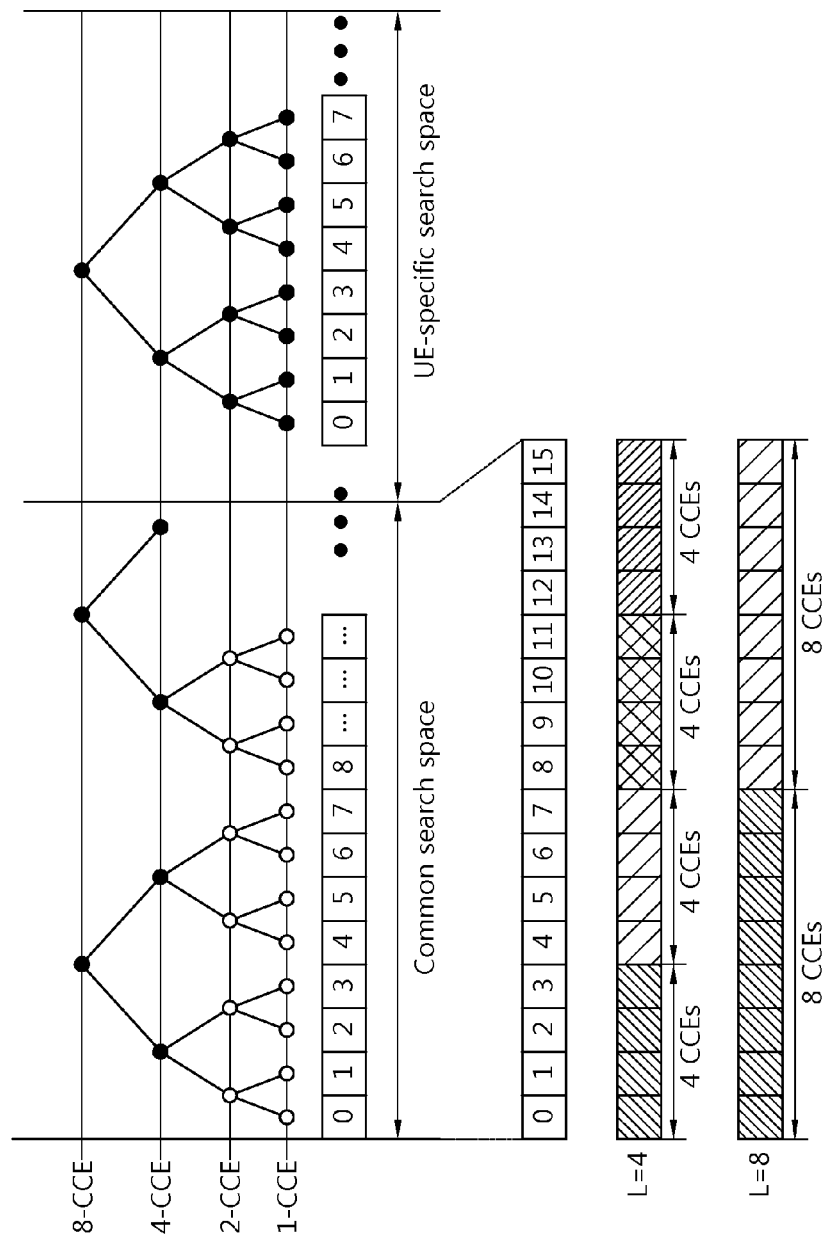
FIG. 5 is an exemplary diagram illustrating monitoring a PDCCH. This may refer to phrase 9 of 3GPP TS 36.213 V10.2.0 (2011-06).

FIG. 5 is an exemplary diagram illustrating monitoring a PDCCH. This may refer to phrase 9 of 3GPP TS 36.213 V10.2.0 (2011-06).

In 3GPP LTE, the UE uses blind decoding in order to detect the PDCCH data. The blind decoding is a scheme that checks a CRC error by demasking a desired identifier to a CRC of a received PDCCH (referred to as a PDCCH candidate) to check whether the corresponding PDCCH is a control channel thereof. The UE cannot find at which position in the control region the PDCCH thereof is transmitted by using a predetermined CCE set level or DCI format.

A plurality of PDCCHs may be transmitted in one subframe. The UE monitors the plurality of PDCCHs in every subframe. Herein, the monitoring represents that the UE attempts decoding the PDCCH according to a format of the monitored PDCCH.

In the 3GPP LTE, in order to reduce a burden caused by the blinding decoding, a search space is used. The search space may be referred to a monitoring set for the UE to receive the PDCCH data. The monitoring set may be created based on a CCE aggregation level. The UE may decode the PDCCH data by monitoring the search space. The CCE aggregation level represents information indicating how many CCEs form one set.

The search space is divided into a common search space and a UE-specific search space. In general, the common search space may be a space including common control information transmitted to all UEs or a plurality of UEs in a cell and the UE-specific search space may be a space including control information transmitted to a specific UE.

For example, the common search space may be constituted by 16 CCEs including CCE indexes 0 to 15. In the common search space, a CCE set level of {4, 8} is supported, and as a result, the UE may perform the blind decoding. However, a PDCCH (DCI format 0, 1A) that transports UE-specific information may be transmitted to even the common search space. In a UE-specific search space, a CCE set level of {1, 2, 4, 8} is supported, and as a result, the UE may perform the blind decoding.

Table 1 shown below shows a PDCCH data candidate depending on an aggregation level monitored by the UE.

TABLE 1

| Type | Search space $S_k^{(L)}$ Aggregation level L | Search space $S_k^{(L)}$ Size [in CCEs] | Number of PDCCH candidates $M^{(L)}$ | DCI format |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of the search space may be decided by Table 1 shown above, and a start point of the search space may be defined differently by considering which space of the common search space and the UE-specific search space the search space is. A start point of the common search space is fixed regardless of the subframe, but a start point of the UE-specific space may be changed for each subframe according to a UE identifier (for example, C-RNTI), a CCE set level, and/or a slot number in a radio frame. When the start point of the UE-specific space is in the common search space, the UE-specific search space and the common search space may overlap with each other.

A search space S(L)k is defined as a set of PDCCH data candidates at a CCE aggregation level L∈{1, 2, 4, 8}. The CCE aggregation level corresponding to the PDCCH data candidate m of the search space S(L)k is given as below.

$$L \cdot \{(Y_k + m') \bmod \lfloor N_{CCE,k}/L \rfloor\} + i \qquad \text{<Equation 1>}$$

Herein, i=0, 1, . . . , L−1, m=0, . . . , M(L)−1, NCCE,k represents the total number of CCEs which may be used in transmitting the PDCCH in a control region of subframe k. The control region includes a set of CCEs numbered with 0 to NCCE,k−1. M(L) represents the number of PDCCH candidates at a CCE set level L in a given search space. If a carrier indicator field is set in the UE, m'=m+M(L)ncif. Ncif represents a value of the CIF. If the CIF is not set in the UE, m'=m.

In the common search space, Yk is set to 0 for two set levels, L=4 and L=8.

In the UE specific search space at the set level L, a variable Yk is defined as below.

$$Y_k = (A \cdot Y_{k-1}) \bmod D \qquad \text{<Equation 2>}$$

Where, Y−1=nRNTI≠0, A=39827, D=65537, k=floor(ns/2), ns represents a slot number in the radio frame.

When the UE monitors the PDCCH based on the C-RNTI, a DCI format and a search space to be monitored are decided according to a transmission mode of the PDSCH. The following table shows an example of the PDCCH monitoring in which the C-RNTI is set.

TABLE 2

| Transmit mode | DCI format | Search space | Transmit mode of PDSCH depending on PDCCH |
|---|---|---|---|
| Mode 1 | DCI format 1A | Common and UE specific | Single antenna port, port 0 |
|  | DCI format 1 | UE specific | Single antenna port, port 0 |
| Mode 2 | DCI format 1A | Common and UE specific | Transmit diversity |
|  | DCI format 1 | UE specific | Transmit diversity |
| Mode 3 | DCI format 1A | Common and UE specific | Transmit diversity |
|  | DCI format 2A | UE specific | Cyclic delay diversity (CDD) or transmit diversity |
| Mode 4 | DCI format 1A | Common and UE specific | Transmit diversity |
|  | DCI format 2 | UE specific | Closed-loop spatial multiplexing |
| Mode 5 | DCI format 1A | Common and UE specific | Transmit diversity |
|  | DCI format 1D | UE specific | Multi-user multiple input multiple output (MU-MIMO) |
| Mode 6 | DCI format 1A | Common and UE specific | Transmit diversity |
|  | DCI format 1B | UE specific | Closed-loop spatial multiplexing |
| Mode 7 | DCI format 1A | Common and UE specific | If the number of PBCH transmit ports is 1, single antenna port and port 0 and if not, transmit diversity |
|  | DCI format 1 | UE specific | Single antenna port, port 5 |

TABLE 2-continued

| Transmit mode | DCI format | Search space | Transmit mode of PDSCH depending on PDCCH |
|---|---|---|---|
| Mode 8 | DCI format 1A | Common and UE specific | If the number of PBCH transmit ports is 1, single antenna port and port 0 and if not, transmit diversity |
|  | DCI format 2B | UE specific | Dual layer transmit (port 7 or 8) or single antenna port, port 7 or 8 |

A purpose of the DCI format is classified as shown in the following table.

TABLE 3

| DCI format | Contents |
|---|---|
| DCI format 0 | Used for PUSCH schedudling |
| DCI format 1 | Used for scheduling one PDSCH codeword |
| DCI format 1A | Used for compact scheduling and random access of one PDSCH codeword |
| DCI format 1B | Used for compact scheduling of one PDSCH codeword having precoding information |
| DCI format 1C | Used for very compact scheduling of one PDSCH codeword |
| DCI format 1D | Used for precoding and compact scheduling of one PDSCH codeword having power offset information |
| DCI format 2 | Used for PDSCH scheduling of UEs set in closed-loop spatial multiplexing mode |
| DCI format 2A | Used for PDSCH scheduling of UEs set in open-loop spatial multiplexing mode |
| DCI format 3 | Used for transmitting TPC command of PUCCH and PUSCH having 2bit power adjustments |
| DCI format 3A | Used for transmitting TPC command of PUCCH and PUSCH having 1 bit power adjustment |

In a DL subframe of the 3GPP LTE, a reference signal and a control channel may be arranged as below.

The control region (alternatively, PDCCH region) includes three former OFDM symbols and the data region to which the PDSCH is transmitted includes residual OFDM symbols.

The PCFICH, the PHICH, and/or the PDCCH are transmitted in the control region. The CFI of the PCFICH indicates three OFDM symbols. In the control region, a region other than the resource in which the PCFICH and/or the PHICH are transmitted becomes a PDCCH region monitoring the PDCCH.

Further, various reference signals are transmitted to the subframe.

A cell-specific reference signal (CRS) may be received by all UEs in the cell and is transmitted throughout an entire downlink band. The reference signal may be transmitted through different resource regions depending on an antenna port. 'R0' represents a resource element (RE) in which the CRS for a first antenna port is transmitted, 'R1' represents an RE in which the CRS for a second antenna is transmitted, 'R2' represents an RE in which the CRS for a third antenna port is transmitted, and 'R3' represents a resource element for a fourth antenna port is transmitted.

An RS sequence for the CRS, rl,ns(m) is defined as below.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{<Equation 3>}$$

Where, represents the maximum number of RBs, ns represents a slot number in the radio frame, and l represents an in-slot OFDM symbol number.

A pseudo-random sequence c(i) is defined by a Gold sequence having a length of 31 shown below.

$$c(n)=(x_1(n+Nc)+x_2(n+Nc))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{<Equation 4>}$$

Where, Nc=1600, and a first m-sequence is initialized to x1(0)=1, x1(n)=0, m=1, 2, . . . , 30.

A second m-sequence is initialized to cinit=210(7(ns+1)+1+1)(2NcellID+1)+2NcellID+NCP at the start of each OFDM symbol. NcellID represents a physical cell identity of the cell, and NCP=1 in a normal CP and NCP=0 in an extended CP.

A UE-specific reference signal (URS) is transmitted to the subframe. The CRS is transmitted in an entire region of the subframe, but the URS is transmitted in the data region of the subframe and is used to demodulate the corresponding PDSCH. In FIG. 5, 'R5' represents an RE in which the URS is transmitted. The URS is also referred to as a dedicated reference signal (DRS) or a demodulation reference signal (DM-RS).

The URS is transmitted only in the RB in which the corresponding PDSCH is mapped. In FIG. 5, R5 is displayed in a region other than the region in which the PDSCH is transmitted, but is used for representing the position of the RE in which the URS is mapped.

The URS is used by only the UE that receives the corresponding PDSCH. An RS sequence for a US, rns(m) is similarly as rns(m) of Equation 3. In this case, m=0, 1, . . . , 12NPDSCH,RB−1 and NPDSCH,RB represents the number of RBs in which the corresponding PDSCH is transmitted. A pseudo random sequence creator is initialized to cinit=(floor(ns/2)+1)(2NcellID+1)216+nRNTI at the start of each subframe. The nRNTI represents an identifier of the UE.

In the case where the URS is transmitted through a single antenna and when the URS is transmitted through multiple antennas, the pseudo random sequence creator is initialized to cinit=(floor(ns/2)+1)(2NcellID+1)216+nSCID at the start of each subframe. The nSCID represents a parameter acquired from a DL grant (for example, DCI format 2B or 2C) associated with the PDSCH transmission.

The URS supports multiple input multiple output (MIMO) transmission. An RS sequence for the URS may be spread depending on an antenna port or layer in the following spread sequence.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 +1 −1] |
| 8 | [−1 +1 +1 −1] |

The layer may be defined as an information path input into a precoder. A rank as the number of a non-zero Eigen value of a channel matrix is equal to the number of layers or the number of spatial streams. The layer may correspond to the antenna port for distinguishing the URS and/or the spread sequence applied to the URS.

Meanwhile, the PDCCH is monitored in a limited region called the control region in the subframe and further, the CRS which is transmitted in an entire band is used to demodulate the PDCCH. A type of the control information is diversified and as the amount of the control information increases the flexibility of scheduling deteriorates only by the existing PDCCH. Further, the enhanced channel (PDCC) is introduced in order to reduce a burden caused by the CRS transmission, The subframe may include 0 or one PDCCH region and one or more EPDCCH region.

The ePDCCH region is a region in which the UE monitors the EPDCCH. The PDCCH region is positioned in maximum four former OFDM symbols of the subframe, but the ePDCCH region may be flexibly in the OFDM symbol after the PDCCH region.

One or more ePDCCH regions are designated in the UE and the UE may monitor the ePDCCH in the designated ePDCCH region.

The base station may notify to the UE information regarding the number/positions/sizes of the ePDCCH regions and/or the subframe in which the ePDCCH is to be monitored through an RRC message, and the like.

In the PDCCH region, the PDCCH may be demodulated based on the CRS. In the ePDCCH region, not the CRS but a demodulation (DM) RS may be defined in order to demodulate the ePDCCH. The associated DM RS may be transmitted in the ePDCCH region.

An RS sequence for the associated DM RS, rns(m) is similarly as rns(m) of Equation 3. In this case, m=0, 1, . . . , 12NRB−1 and NRB represents the maximum number of RBs. The pseudo random sequence creator is initialized to cinit=(floor(ns/2)+1)(2NEPDCCH,ID+1)216+ nEPDCCH,SCID at the start of each subframe. ns represents a slot number in the radio frame, NEDPDCCH, ID represents a cell index associated with the corresponding EPD-CCH region, and nEPDCCH,SCID represents a parameter given from upper layer signaling.

Each ePDCCH region may be used in scheduling for different cells. For example, the ePDCCH in the ePDCCH region may transport scheduling information for a primary cell and the ePDCCH in the ePDCCH region may transport scheduling information for a secondary cell.

When the ePDCCH in the ePDCCH region is transmitted through the multiple antennas, the same precoding as the ePDCCH may be applied to the DM RS in the ePDCCH region.

A transmission resource unit for the EPCCH is referred to as an enhanced control channel element (eCCE) compared with the case in which the PDCCH uses the CCE by the unit of the transmission resource. The aggregation level may be defined by the unit of the resource monitoring the ePDCCH. For example, when 1 eCCE is a minimum resource for the ePDCCH, the aggregation level may be defined like L={1, 2, 4, 8, 16}.

Hereinafter, an ePDCCH search space may correspond to the EPDCCH region. In the EPDCCH search space, one or more ePDCCH candidates may be monitored for each of one or more aggregation levels.

FIG. 6 illustrates one example of a subframe including an ePHICH.

The subframe may include a PDCCH region 610 and an ePDCCH region 620. The ePDCCH region 620 may be a search space monitoring an EPDCCH data candidate and a search space monitoring an enhanced physical HARQ indicator channel (ePHICH) 630.

The existing PHICH may be monitored in the OFDM symbol region 610 in which the PDCCH is defined. The PHICH was used in transmitting HARQ acknowledgements for uplink shared channel (UL-SCH) transmission. The ePHICH is added to the PHICH to be set in the subframe to be used to transmit an ACK/NACK signal.

The ePHICH may be set in and transmitted to a resource region in which the PDSCH data is transmitted similarly as the ePDCCH. The ePHICH may be demodulated by using the URS. The UE may receive the ePHICH through blind detection. The base station may assign the ePHICH to the subframe for each UE or a plurality of UEs may be assigned to share the ePHICH. When the ePHICH is assigned for each UE, the identifier (for example, C-RNTI) of the corresponding UE may be masked to ePHICH. When the ePHICH is assigned for each UE group, the identifier of the corresponding UE group may be masked to the ePHICH.

The ePHICH 630 may include a plurality of ACKs/ NACKs in a form of the DCI format. In FIG. 6, 'ANx' represents an x-th ACK/NACK.

The UE may monitor the ePHICH 630 in the ePDCCH 620 region. A separate identifier (for example, ePHICH-RNTI) may be defined in order for the UE to monitor the ePHICH 630. Alternatively, a group identifier (for example, G-ePHICH-RNTI) may be defined for each group and each UE may monitor the ePHICH 630 for a group that belongs thereto.

Since the ePHICH 630 transports the plurality of ACKs/ NACKs for the plurality of UEs, the ePHICH 630 needs to notify to each UE which one of the plurality of ACKs/ NACKs is the ACK/NACK of the ePHICH 630. The base station may notify the position of the ACK/NACK in an ePHICH 830 to each UE through the signaling such as the upper layer message.

When the UE group is set, a logical index of an uplink grant of a specific UE in the uplink grant grouped for the UE group may be associated with a logical index of an ACK/ NACK of the specific UE in the ePHICH.

Figure 7:
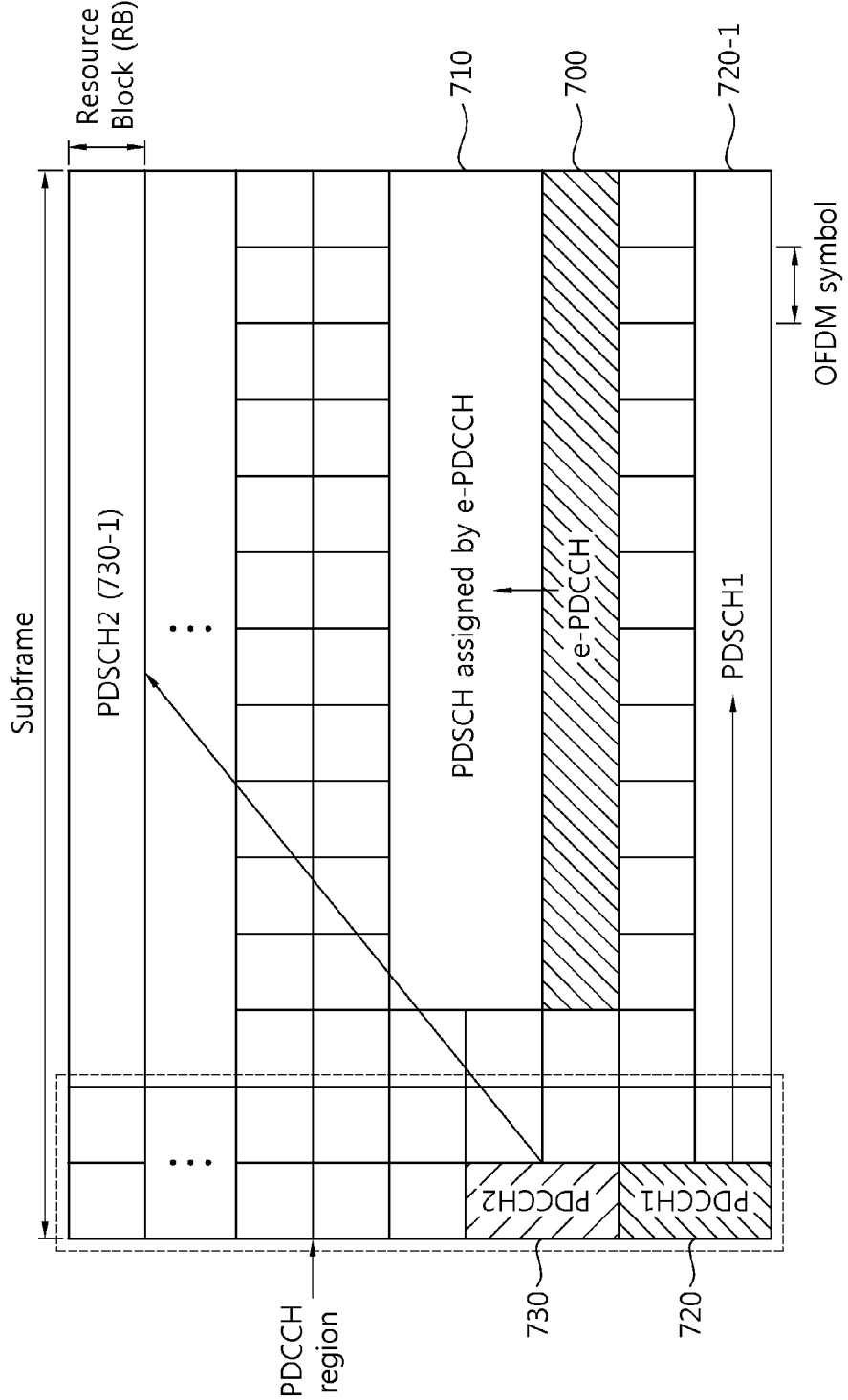
FIG. 7 is a conceptual diagram illustrating a channel newly defined in order to transmit control information through a downlink.

FIG. 7 is a conceptual diagram illustrating a channel newly defined in order to transmit control information through a downlink.

The channel newly defined to transmit the control information may be referred to as an enhanced physical downlink control channel (ePDCCH) 700. The ePDCCH 700 is a channel assigned to the existing PDSCH resource region. The UE may demodulate the ePDCCH data based on the cell-specific reference signal (CRS) or the demodulation reference signal (DM-RS). The ePDCCH 700 may be a channel used for implementing transmit diversity or spatial multiplexing (SM).

Referring to FIG. 7, the resource of the downlink channel may include PDSCH regions 720-1 and 730-1 assigned based on legacy PDCCH data 720 and 730 included in a legacy PDCCH resource region, and a PDSCH region 710 assigned based on ePDCCH data 700 included in the ePD-CCH region.

The base station may transmit to the UE the ePDCCH data 710 through various resource regions. For example, the base station may transmit to the UE the ePDCCH data 700 through a 14-th OFDM symbol which is a last symbol from a 4-th OFDM symbol of the subframe in a predetermined frequency bandwidth. As another method, the base station may transmit to the UE the ePDCCH data 700 by using only a 7-th OFDM symbol from the 4-th OFDM symbol of the subframe which is a 4-th OFDM symbol of a first slot or transmit to the UE the ePDCCH data 700 through only an OFDM symbol corresponding to a second slot. The base station may transmit the UE the control information so that a resource region transmitting the PDCCH data 720 and 730 and a resource region transmitting the ePDCCH data 700 do not overlap with each other. The base station may variously decide a position of a resource region transmitting downlink assignment and uplink scheduling grant information in the resource region transmitting the ePDCCH data 700.

The base station may transmit control data and UE-specific traffic data through the ePDCCH 700 and the PDSCH 710 in the resource region assigned to the existing PDSCH. In a wireless network in which a plurality of cells are implemented by a plurality of layers, such as a macro cell and a pico cell by using the subframe including the ePDCCH 700 and the PDSCH 710, mutual interference may be reduced among data transmitted from respective cells.

For example, when a multimedia broadcast single frequency network (MBSFN) subframe is configured and an almost blank subframe (ABS) is applied to the MBSFN subframe, interference does not occur in residual OFDM symbol regions other than first two OFDM symbols. The MBSFN subframe as a subframe for transmitting a physical multicast channel (PMCH) means a subframe in which the CRS may not be transmitted in residual resource regions other than the PDCCH region constituted by first two OFDM symbols. An ABS represents a section in which the macro cell is not transmitted when the plurality of cells are implemented in multi layers.

The base station may transmit the control data and the traffic data to the UE in a resource region in which the interference is limited. The UE may decide a search space of the ePDCCH 700 based on an upper layer signal such as a radio resource control (RRC). The UE performs the blind decoding only in the search space of the ePDCCH 700 to demodulate the ePDCCH data 700. The UE may demodulate the ePDCCH data 700 based on the UE-specific reference signal such as the DM-RS.

However, the UE may not normally demodulate the ePDCCH data 700 due to unexpected interference (for example, ePDCCH search space reconfiguration, RRC reconfiguration, and the like). When the UE may not normally demodulate the ePDCCH data 700, the control information may be acquired by demodulating the PDCCH data 720 and 730 instead of the ePDCCH data 700.

The UE may operate even in a fallback mode to demodulate the PDSCH data based on a result of demodulating the PDCCH data 720 and 730 by adding the PDCCH data 720 and 730 to a normal mode to receive the PDSCH data based on a result of demodulating the ePDCCH 700.

For example, the UE may generally receive the PDSCH data based on the result of demodulating the ePDCCH data 700 and thereafter, demodulate the PDSCH data based on the result of demodulating the PDCCH data 720 and 730. That is, the UE may use both the normal mode and the fallback mode in order to demodulate the PDSCH data.

The UE switches the normal mode to the fallback mode in a predetermined subframe to demodulate the PDSCH data. For example, when the UE may not demodulate the ePDCCH data, the UE may acquire information for demodulating the PDSCH data through the predetermined subframe so as to demodulate the PDSCH data. The PDCCH data may be data which may duplicate with the ePDCCH data, but the PDCCH data may include new data which is not present in the ePDCCH data.

For example, when a situation in which the UE may not receive the ePDCCH data exceeds a predetermined time interval due to an abnormal channel situation, the UE operates in the fallback mode afterwards to perform the blind decoding for the PDCCH data to acquire the control information.

As yet another example, when predetermined conditions are satisfied, such as 1) the case in which the quality of the received signal is equal to or larger than a threshold value at the time when the UE receives the ePDCCH data, 2) the case in which the a demodulation failure occurs at N times or more during a predetermined time interval at the time when the UE demodulates the ePDCCH or 3) the case in which a time corresponding to N subframes elapsed after a demodulation failure for the ePDCCH data is started, and 4) the case in which a timer is terminated by actuating the timer when the demodulation failure for the ePDCCH data occurs, the UE may acquire the control data by demodulating the PDCCH data instead of the ePDCCH data.

The base station may decide a fallback subframe in which the UE may operate in the fallback mode by various methods. The fallback subframe is a subframe in which the UE operates in the fallback mode to perform demodulation. For example, the base station may designate the fallback subframe by the unit of the radio frame, designate a specific subframe as the fallback subframe every integer times, designate a subframe in which broadcasted information (physical broadcast channel (PBCH)) is transmitted as the fallback subframe, or designate the fallback frame in association therewith, or designate the fallback frame in a pattern form of a specific subframe configured as the RRC in advance or a subframe pattern form.

Figure 8:
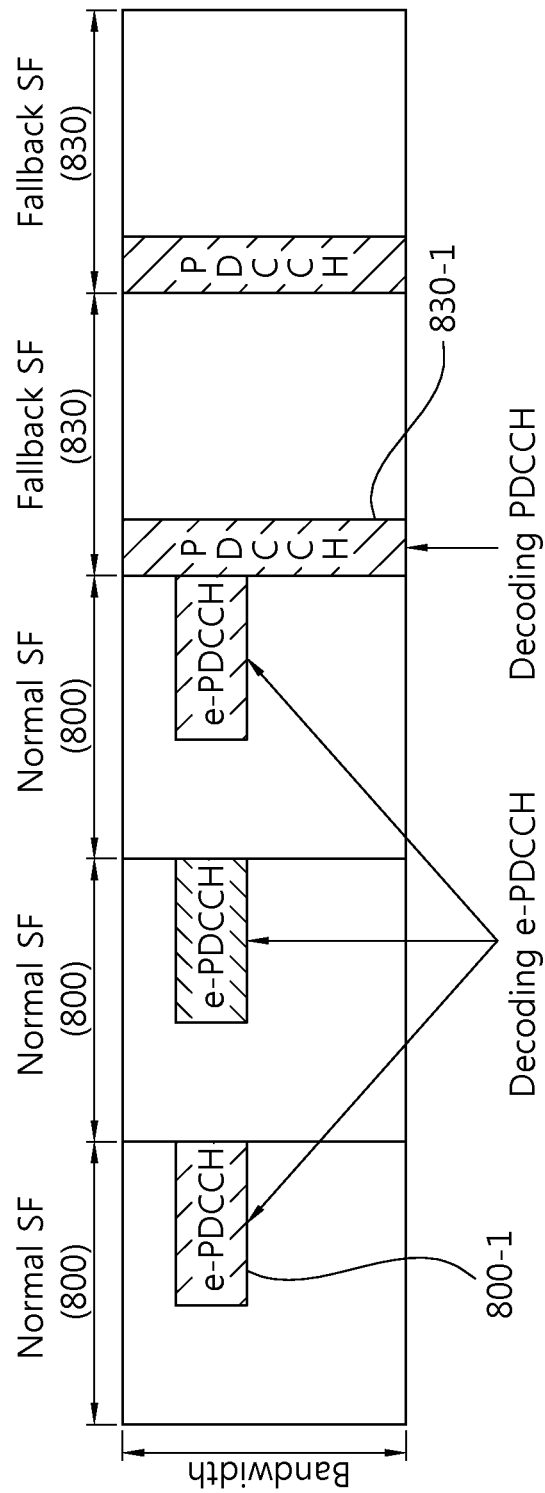
FIG. 8 is a conceptual diagram illustrating a method for setting a fallback subframe.

FIG. 8 is a conceptual diagram illustrating a method for setting a fallback subframe.

Referring to FIG. 8, the frame may include a normal subframe 800 and a fallback subframe 830. The normal subframe 800 represents a subframe in which demodulates the PDSCH data based on ePDCCH data 800-1. The fallback subframe is a frame in which the UE may not demodulate the ePDCCH data or demodulates the PDSCH data based on not the ePDCCH data but PDCCH data 830-1.

The base station may transmit the PDSCH data to the UE by deciding whether to transmit the PSDCH data through the PDCCH 830-1 or the ePDCCH 800-1 according to the control information. For example, the base station may transmit to the UE changed and updated information of system information or important information such as cell selection/cell reselection, broadcasted information, information regarding blind decoding in the common search space of the LTE-1, and the like through the PDCCH.

Examples of the information include information (e.g., the MIB message, the SIB message, the SI message, a paging signal, a random access channel response (RACH) transmitted the PDCCH data identified as a master information block message (MIB message), a system information block message (SIB) message, a system information (SI) messages, a system information radio network temporary identifier (SI-RNTI), a paging radio network temporary identifier (P-RNTI), and a random access radio network temporary identifier (RA-RNTI), and the like.

The base station may transmit dynamic scheduling information (downlink assignment and uplink scheduling grant), and information associated therewith through the ePDCCH 800-1. The base station does not transmit through the ePDCCH 800-1 the information transmitted through the PDCCH 830-1. That is, the common search space does not present and only the UE-specific search space is present in the existing ePDCCH 800-1 region.

Figure 9:
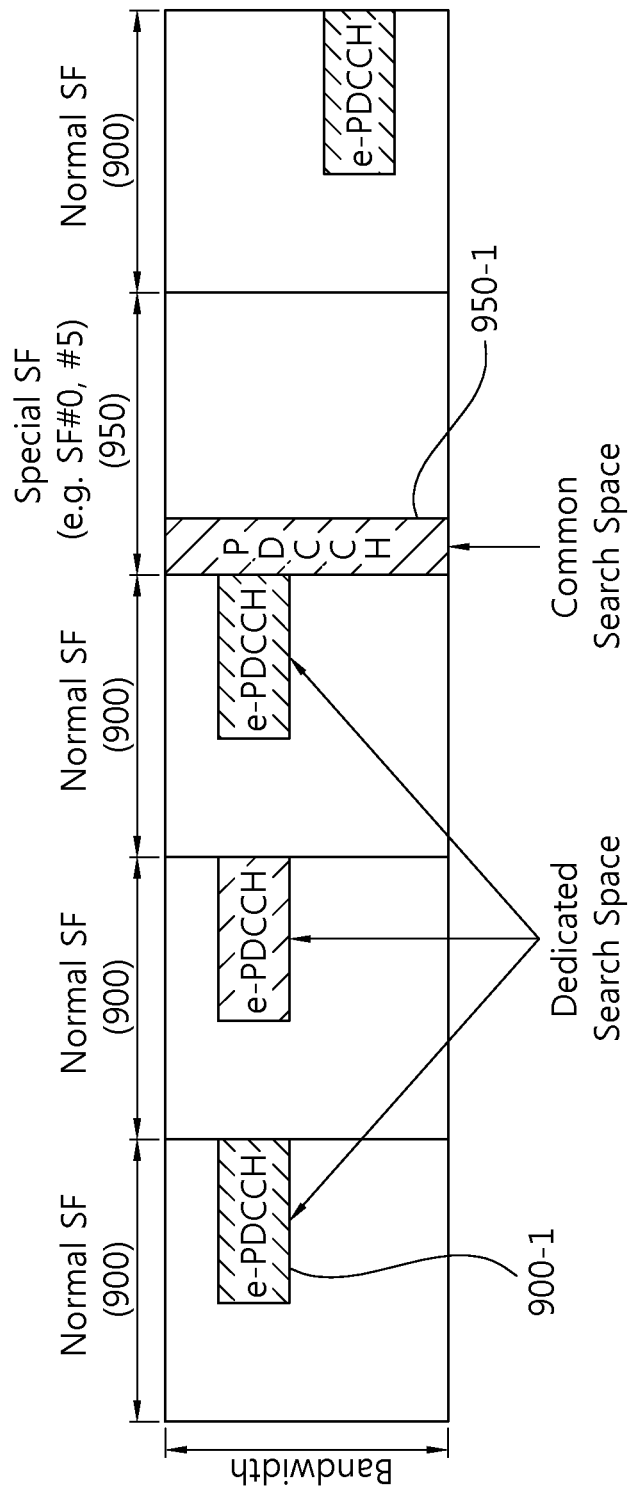
FIG. 9 is a conceptual diagram illustrating a method for setting a fallback subframe.

FIG. 9 is a conceptual diagram illustrating a method for setting a fallback subframe.

Referring to FIG. 9, the base station may assign both the common search space and the UE-specific search space to an ePDCCH 900-1. The UE may receive the control information by performing blind decoding in a common search space of a PDCCH 950-1 in designated subframes (for example, subframe #0 and subframe #5). Complexity of the blind decoding of the UE may not be changed. The UE-specific search space of the ePDCCH 900-1 in the designated subframes may include UE-specific control information.

The UE may intentionally receive the PDCCH data in order to receive specific primary information (paging information and a power control command).

The present invention discloses various methods that transmit the control information by setting a common search space (CCS), an enhanced common search space (eCSS), a UE-specific search space (USS), or an enhanced UE-specific search space (eUSS) in the PDCCH resource region and the resource region of the ePDCCH. The CSS represents the common search space defined in the PDCCH and the USS represents the UE-specific search space defined the PDCCH. The eCSS represents the common search space defined in the ePDCCH and the eUSS represents the UE-specific search space defined the ePDCCH.

The UE may maintain complexity, capability, and the number of trial times of the blind decoding in performing the blind decoding based on the CSS, the eCSS, the USS, and the eUSS.

The search space is differently configured in the fallback subframe and a non-fallback subframe, which may be created. An operation of the UE that receives the fallback subframe may be different from that of the UE that receives the non-fallback subframe. When it is assumed that the blind decoding capability of the UE is not changed for each subframe, the UE may perform the blind decoding in the fallback subframe and the non-fullback subframe (for example, the normal subframe, the MBSFN subframe, and the like) in a range not to exceed the blind decoding capability.

For example, it may be assumed that the fallback subframe may use only one DCI format in order to transmit the control information to the UE. In this case, the UE may use all blind decoding capabilities in order to detect the DCI format defined in the fallback subframe.

For example, the number of times at which the UE tries to perform the blind decoding performed to acquire the control information in the subframe may be limited to a predetermined number (for example, 44 or 64). When only one DCI format is present in the subframe, the UE may use the number of all trial times of performing the blind decoding in order to detect one DCI format.

When one or more DCI formats are present in the subframe, the number of times at which the UE performs the blind decoding to detect the DCI format may be assigned for each format depending on the UE. DCI formats having the same size, such as DCI format 1A and DCI format 0 are regarded as one DCI format, and as a result, the UE may perform the blind decoding.

When the number of search spaces is 1 or more, the UE may perform the blind decoding by distributing the number of blind decoding trial times depending the search space. Even in the non-fallback subframe, the number of blind decoding times may be distributed depending on types of the DCI format and the search space similarly as in the fallback subframe.

As one example, it may be assumed that only the common search space is present in the fallback subframe and the base station transmits to the UE only DCI formats 1A and 1C through the common search space. Further, it may be assumed that only the UE-specific search space is present in the non-fallback subframe and the base station transmits only a dependent DCI format to the UE in a transmit mode. In this case, the number of times of the blind decoding performed by the UE in the common search space and the number of times of the blind decoding performed by the UE in the UE-specific search space may be set to have a similar value or the same value.

As another method, the number of times of the blind decoding performed by the UE may be divided and set depending on the search space, the DCI format, and a candidate position in the same subframe. It may be assumed that the number of times of the blind decoding performed by the UE is N. The UE may perform N-times blind decoding in each of the PDCCH resource region and the ePDCCH resource region that are present in the subframe. For example, when the UE perform K-times blind decoding in the PDCCH resource region to detect the DCI format, the UE may detect the DCI format in the ePDCCH resource region by performing residual N−K-times blind decoding. When the UE performs the blind decoding only in the ePDCCH resource region, the UE may detect the DCI format by performing N-times blind decoding in the ePDCCH resource region.

In the present invention, the DCI format transmitted through the subframe is searched by maximally using the number of times of available blind decoding performed the UE to minimize a blocking probably that occurs when the base station transmits the DCI. A PDCCH blocking probability represents a probability that the search space is duplicated among the plurality of UEs, and as a result, PDCCH scheduling is not achieved.

The positions and the number of ePDCCH candidates in the ePDCCH region searched by the UE may be changed depending on the subframe received by the UE. In particular, the positions and the number of ePDCCH candidates in the ePDCCH region searched by the UE may be changed depending on whether the UE performing the blind decoding of the PDCCH data in the subframe.

It may be assumed that the total number of blind decoding times which may be performed by the UE in a single subframe is fixed. When the UE performs the blind decoding for the search space that is present in the PDCCH resource region of the subframe, the positions and the number of ePDCCH candidates in which the UE performs the blind decoding in the subframe may be changed.

According to the exemplary embodiment of the present invention, first, N ePDCCH data candidate positions may be set in the ePDCCH resource region and a separate index may be applied to the set ePDCCH data candidates. For example, when the number of ePDCCH data candidates is N, indexes called 0, 1, . . . , N−1 may be applied.

The blinding decoding performed by the UE will be described below based on the indexes of the ePDCCH data candidates. It may be assumed that N-times blind decoding may be performed for the PDCCH data and the ePDCCH data. If the UE performs K-times blind decoding for the PDCCH data candidate included in the subframe, the UE may use residual N−K blind decoding times in order to perform the blind decoding for the ePDCCH data candidate.

The UE may perform the blind decoding for candidates having indexes corresponding to 0 to N−K−1 among the ePDCCH data candidates at the residual N−K blind decoding times. The method is one method for selecting N−K ePDCCH candidates among the ePDCCH data candidates in the search space of the UE. The UE select N−K ePDCCH candidates to perform the blind decoding for the selected N−K ePDCCH candidates by using another method.

For example, the UE selects ePDCCH candidate indexes corresponding to last N−K on the indexes of the ePDCCH candidates to perform the blind decoding for the selected ePDCCH candidate indexes. As yet another example, N−K indexes output through an operation of floor{n*N/(N−K)} (n=0, 1, ..., N−K−1) may be selected in order to select N−K ePDCCH candidates that will perform the blind decoding among N ePDCCH candidates maximally evenly (herein, floor{x} represents a maximum integer smaller than x).

As still another method, the base station may transmit to the UE N positions of the ePDCCH candidates and N−K ePDCCH candidate positions that will perform the blind decoding through the upper layer signaling.

Figure 10:
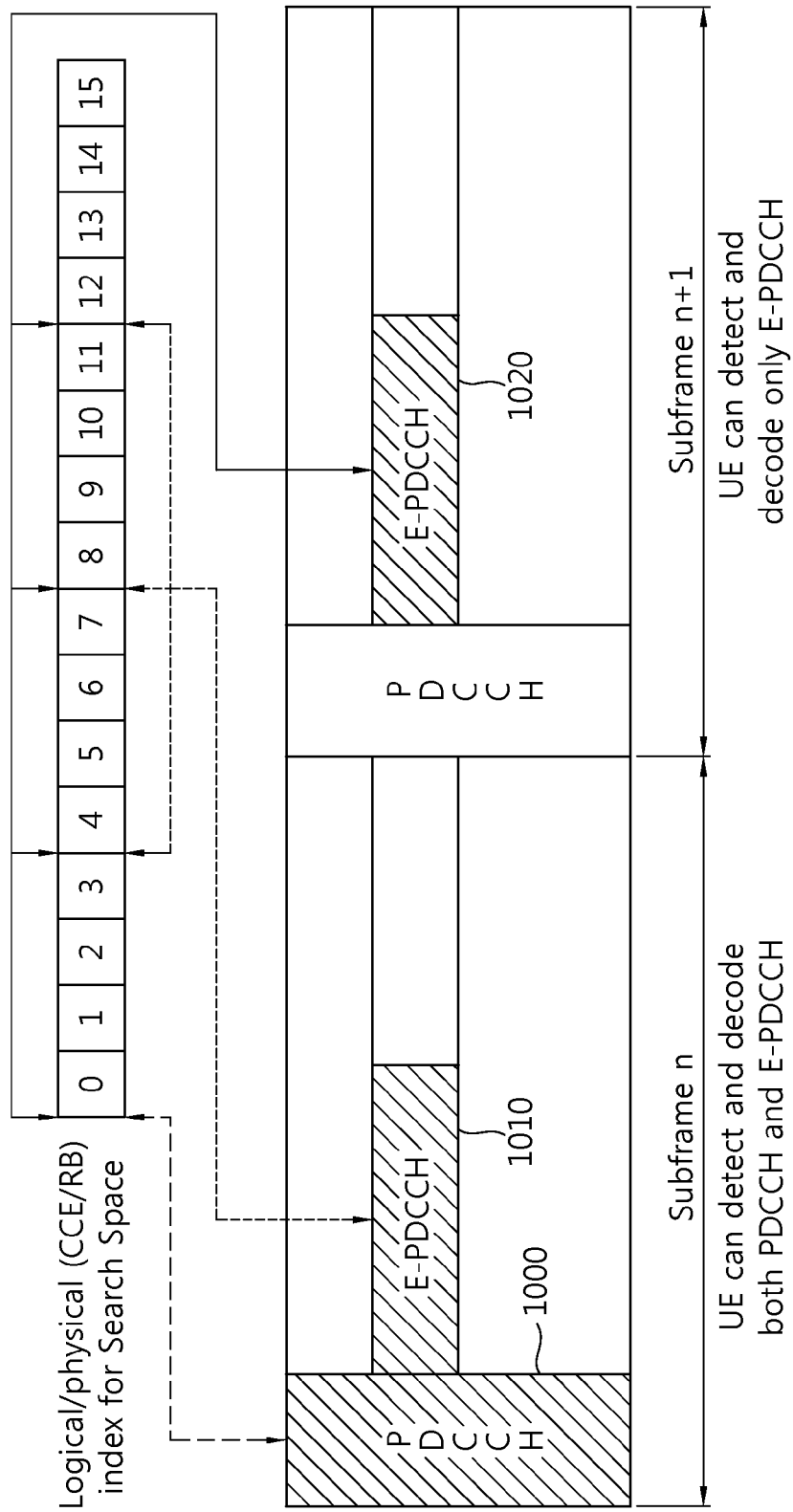
FIG. 10 is a conceptual diagram illustrating a search space distributed in the subframe according to the exemplary embodiment of the present invention.

FIG. 10 is a conceptual diagram illustrating a search space distributed in the subframe according to the exemplary embodiment of the present invention.

Referring to FIG. 10, the base station may differently set the ePDCCH data candidate and the PDCCH data candidate according to the subframe.

A first subframe is a subframe in which both a PDCCH 1000 and an ePDCCH 1010 are included in the subframe. In the case of the first subframe, the base station may distribute the PDCCH data candidates and the ePDCCH data candidates in each channel region of the subframe.

For example, it may be assumed that in the first subframe, a control channel element (CCE) aggregation level is 4 and the number of the positions of all candidates searched by the UE 4. The base station may assign one PDCCH data candidate to the PDCCH resource region and assign three ePDCCH data candidates to the ePDCCH resource region. When the base station assigns the candidates by using CCEs having indexes of 0 to 16, one PDCCH data candidate among four candidates may be set to CCEs having indexes of 0 to 3 and three ePDCCH data candidates may be set to CCEs having indexes of 4 to 15. The UE performs the blind decoding for four candidates to acquire the control data.

A second subframe is a subframe including only an ePDCCH 1020. In the case of the second subframe, the base station distributes the ePDCCH data candidates to the subframe to transmit the control data to the UE. It may be assumed that the second subframe has an aggregation level of 4 and the number of the positions of all of the candidates is 4 similarly as the first subframe. In this case, the base station may set four ePDCCH candidates through 16 CCEs of the ePDCCH resource region. The UE may acquire the control data by performing the blind decoding for 16 CCEs of the ePDCCH resource region.

In FIG. 10, a space in which the UE searches the PDCCH data candidate and the ePDCCH data candidate may mean the common search space and the UE-specific search space.

As a method that divides the position of the PDCCH candidate and/or ePDCCH candidate in the subframe, the following method may be used. For example, the position of the candidate may be decided so that the PDCCH candidate and the ePDCCH candidate are positioned on the subframe with even distribution based on Equation 1 shown below.

$$f(i) = c * \left\lfloor \frac{i*N + a}{K} \right\rfloor + b \quad \text{<Equation 2>}$$

In Equation 5, i represents a candidate index, f(i) represents a selected candidate index, N represents the total number of all candidates in the search space to be divided, K represents the number of candidates actually used as the PDCCH data candidate or the ePDCCH data candidate in the search space.

Referring to Equation 1, the positions of the candidates which the base station assigns to the PDCCH resource region or the ePDCCH resource region in the subframe including the PDCCH 1000 and the ePDCCH 1010 may be changed depending on K. Further, additionally, a candidate that assigns the PDCCH data candidate or the ePDCCH data candidate among all available candidates in an available search space may be selected by controlling a, b, and c values. A parameter may be used to shift the position of the candidate that assigns the PDCCH data candidate or the ePDCCH data candidate or differently set a pattern to select the PDCCH data candidate or the ePDCCH data candidate.

In the exemplary embodiment of the present invention, the common search space may be set in the ePDCCH or the ePDCCH resource region. The common search space is a search space set to transfer the control data and the system data to be transferred to a plurality of or all UEs. In the search space assigning method according to the exemplary embodiment of the present invention, both the common search space and the UE-specific search space may be defined even for the ePDCCH resource region. In the case of the common search space defined in the existing PDCCH resource region, the CCE aggregation level is 4 or 8 and the position of the CCE corresponding to the common search space is defined separately from the UE-specific search space.

In the exemplary embodiment of the present invention, a part or both of the common search space and the UE-specific search space may be set to overlap with each other in defining both the common search space and the UE-specific search space in the ePDCCH resource region. When a space in which the common search space and the UE-specific search space overlap with each other is designed, the base station may configure the common search space by depending on the blind decoding candidate position of the common search space.

In general, the common search space may be set to transfer common control information (for example, the system information) to the plurality of UEs in the cell. Data included in the common search space need to be transmitted to all UEs as a receiving target with a small number of errors. For example, the common search space defined in the ePDCCH may be set at the position of the ePDCCH data candidate having a relatively high aggregation level like the CCE aggregation level L of 4 and 8.

It may be assumed that for example, the UE-specific search space is a space to search the ePDCCH data candidate based on CCE aggregation levels 1, 2, 4, and 8 based on the UE. The UE may perform the blind decoding for the UE-specific search space by differentiating the number of blind decoding times according to the CCE aggregation levels. When the CCE aggregation level is 4 or 8, the UE may perform the blind decoding by considering that the DCI format transmitted through the common search space may be detected in the ePDCCH data candidate that performs the blind decoding.

When the CCE aggregation level is 4 or 8, the DCI format transmitted through the common search space may be configured with the same size as DCI format 1A/0 in order to detect the DCI format transmitted through the common search space of the ePDCCH resource region. In this case, as a method similar as a method for distinguishing DCI format 1A and DCI format 0, the UE may search the DCI format transmitted through the common search space in the ePDCCH resource region. That is, an indicator is set for the DCI format transmitted through the common search space to indicate the DCI format of the common search space. The UE performs demodulation by searching the DCI format based on the indicator, and as a result, the blind decoding complexity of the UE may be reduced.

As another method in which the UE divides the common search space, the common search space may be divided by various schemes such as a method using a separate RNTI or a method for dividing the commons search space by setting the indicator in the DCI field. Further, the UE may be configured to search and detect only the DCI format transmitted through the common search space with respect to specific CCE aggregation level values (for example, 4 and 8).

In the aforementioned common search space setting method, the CCE aggregation levels used to search the common search space and the UE-specific search space which are exemplarily used are one example. That is, the common search space may be defined and used in the ePDCCH by various schemes. For example, another aggregation level (for example, L=12) may be defined and used for the common search space of the ePDCCH.

The candidate positions of the UE-specific search space and the common search space may be duplicated with each other only for some CCE aggregation levels or for all CCE aggregation levels. Alternatively, in the UE-specific search space and the common search space, as the CCE aggregation levels for searching the ePDCCH data candidates, different values may be used. Further, in the common search space, a CCE aggregation level value different from the CCE aggregation level value of the UE-specific search space for searching the ePDCCH candidate may be defined and used.

Alternatively, in the UE-specific search space, some of the CCE aggregation levels for searching the ePDCCH data candidate are selected to decide some CCE aggregation levels as the CCE aggregation level used in the common search space. For example, it is assumed that as the CCE aggregation levels, 1, 2, 4, and 8 may be used. In this case, when it is assumed that the CCE aggregation level used in the common search space is 4, it may be assumed that as the CCE aggregation level, 4 is not used and as the CCE aggregation levels, residual 1, 2, and 8 are used in the UE-specific search space. The UE may detect the DCI format defined in the common search space based on the CCE aggregation level of 4 in the ePDCCH resource region and detect the DCI format defined in the UE-specific search space based on the aggregation levels of 1, 2, and 8 in the ePDCCH resource region.

The base station may transmit the control information to the UE based on the DCI format newly defined through the ePDCCH. The newly defined DCI format may have the same size and format as the existing DCI format 1C. Herein, the newly defined DCI format may be referred when the UE operates in the fallback mode. Further, the newly defined DCI format may have a common frame that may be used for a transmission mode (TM) dependent mode. The control information transmitted through the common search space may be information for some UEs (a UE sharing the DM-RS and UEs grouped for a specific purpose).

Table 5 shows a method for assigning the search spaces CSS, USS, eCSS, and eUSS in the subframe according to a scenario.

TABLE 5

| | PDCCH | | E-PDCCH | | |
|---|---|---|---|---|---|
| | CSS | USS | E-CSS | E-USS | Comments or use cases |
| 1 | O | | | | CSS fallback |
| 2 | | O | | | USS fallback |
| 3 | | | O | | E-CSS only |
| 4 | | | | O | E-USS only |
| 5 | O | O | | | PDCCH only mode or PDCCH fallback |
| 6 | O | | O | | CSS/E-CSS L and/or C partitioning |
| 7 | O | | | O | C/U partitioning |
| 8 | | O | O | | |
| 9 | | O | | O | USS/E-USS L and/or C partitioning |
| 10 | | | O | O | E-PDCCH only mode |
| 11 | O | O | O | | |
| 12 | O | O | | O | CSS fallback, USS/E-USS L and/or C partitioning |
| 13 | O | | O | O | CSS/E-CSS L and/or C partitioning |
| 14 | | O | O | O | U/SS/E-USS L and/or C partitioning |
| 15 | O | O | O | O | All kinds of partitioning is possible |
| 16 | | | | | NA |

Referring to FIG. 5, the CSS defines the common search space defined in the PDCCH, the USS defines the UE-specific search space defined in the PDCCH, the eCSS defines the common search space defined in the ePDCCH, and the eUSS defines the UE-specific search space defined in the ePDCCH.

For example, it is assumed that as the CCE aggregation levels, 1, 2, 4, and 8 may be used in the CSS. The UE may perform the blind decoding for the control information based on the CCE aggregation levels of 1, 2, 4, and 8. Further, in the USS, as the CCE aggregation levels, 4 and 8 may be used. The UE may perform the blind decoding for the control information based on the CCE aggregation levels of 4 and 8. When the size of the CSS is 16 CCEs and the CCE aggregation level is 4, the position of the PDCCH data candidate may be 4 and the when the CCE aggregation level is 8, the position of the PDCCH data candidate may be 2.

The CSS, the USS, the eCSS, and the eUSS may be configured without a separate boundary. If the search space may be separated and defined in advance, any one search space may be configured together in another search space as described above. For example, when any one search space is configured together in another search space, the common search space and the UE-specific search space may not be distinguished and the CSS and the USS may be distinguished according to the DCI format detected by the UE.

Figure 11:
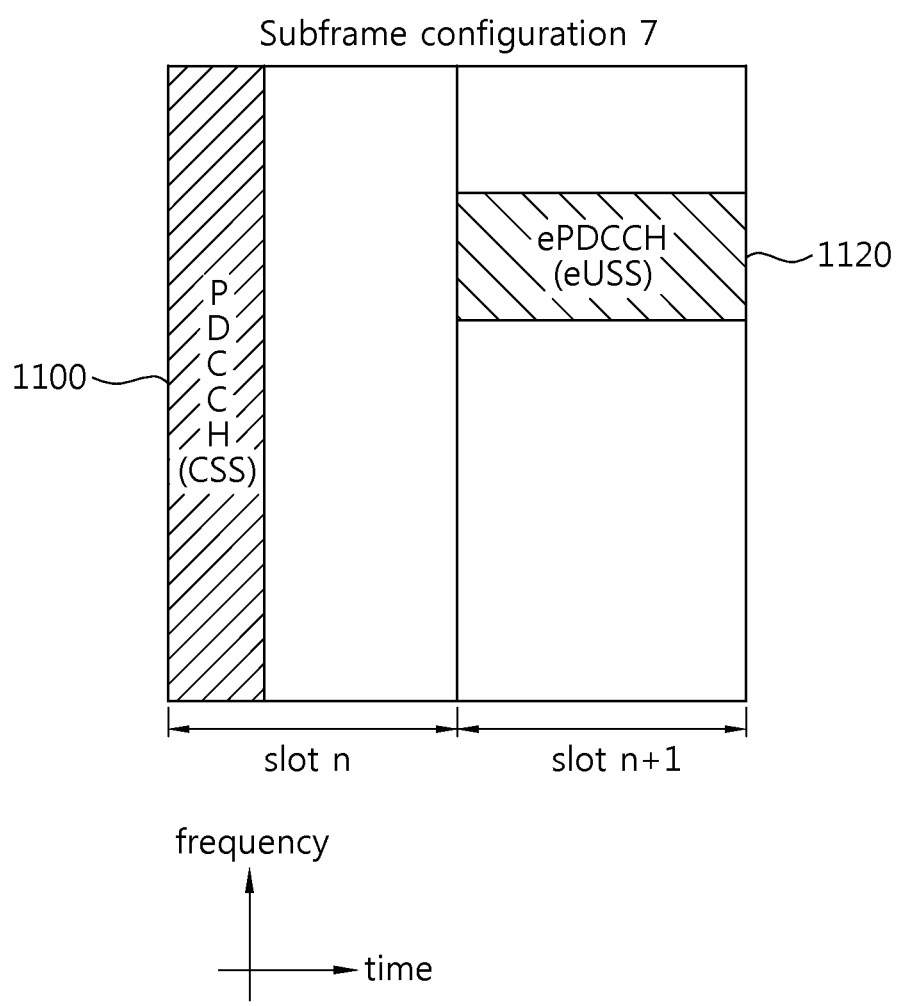
FIG. 11 is a conceptual diagram illustrating subframe setting method 7 of Table 5.

FIG. 11 is a conceptual diagram illustrating subframe setting method 7 of Table 5.

FIG. 11 illustrates a method for dividing the search space, which corresponds to the subframe setting method 7. The base station may set the common search space in the PDCCH 110 of the subframe and set the UE-specific search space in the ePDCCH 1120. The UE may search the PDCCH data candidate in the common search space set in the PDCCH 1100 and search the ePDCCH data candidate in the UE-specific search space set in the ePDCCH 1120.

That is, the base station sets the common search space in the stable PDCCH 1100 in the subframe and sets the eUSS in the ePDCCH 1120 to transmit the control information through combination of the CSS and the eUSS. The base station may transmit the control information in the UE-specific DCI format through the ePDCCH 1120 and transmit the common control information such as the system information through the PDCCH 1100.

Figure 12:
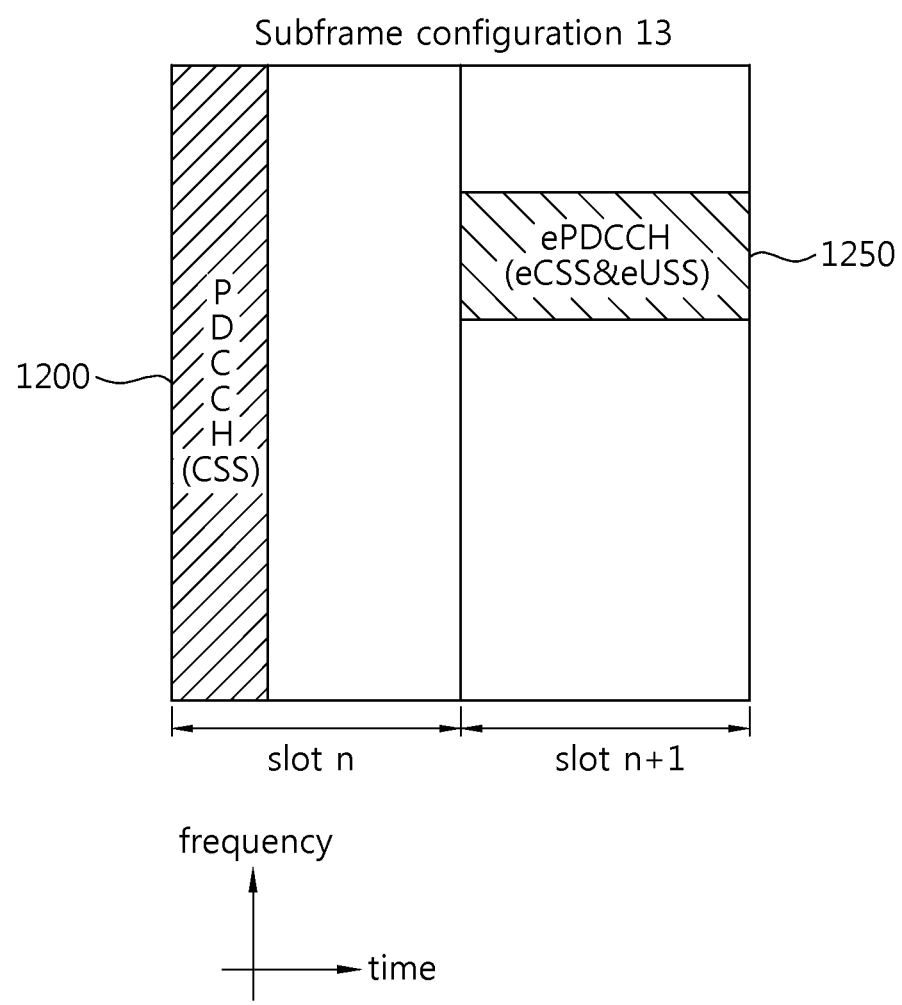
FIG. 12 is a conceptual diagram illustrating subframe setting method 13 of Table 5.

FIG. 12 is a conceptual diagram illustrating subframe setting method 13 of Table 5.

The subframe setting method 13 is the case in which the base station sets the common search space eCSS and the UE-specific search space eUSS in an ePDCCH 1250 and additionally creates the subframe in which the common search space CSS is set in the PDCCH 1200. In this case, the UE may search the PDCCH data candidate and the ePDCCH data candidate that are present in three search spaces in one subframe. The UE distributes the blind decodable times to three search spaces to perform blind decoding for the search space. Since the complexity of the blind decoding significantly depends on the number of blind decoding times, the number of blind decoding times for three search spaces may be set so as not to increase the complexity.

The CSS and the eCSS are the common search spaces and the position of the candidate for transmitting the control data is distributed in the CSS and the eCSS to be searched. As another example, the CCE aggregation levels used in the respective common search spaces are separately defined to decide the candidate. For example, the UE may perform the blind decoding in the search space by separately defining the aggregation level using the CCE aggregation level as 4 and the CCE aggregation level as 8 in the eCSS. As yet another example, when the CCE aggregation level is 4 with respect to CSS, the search space may be assigned to have two candidates and when the CCE aggregation level is 8, the search space may be assigned to have one candidate. Similarly even in the case of the eCSS, when the CCE aggregation level is 4, the search space may be assigned to have two candidates and when the CCE aggregation level is 8, the search space may be assigned to have one candidate. In addition to the such a method, the candidates may be distributed to have different candidate positions for each search space without evenly distributing the candidates with respect to the CSS and the eCSS.

That is, at least one search space of the common search space and the UE-specific search space is partitioned, the position of the candidate searched by the UE may be decided with respect to each search space by controlling the CCE aggregation level and the position of the candidate with respect to the partitioned search space. That is, like the case in which the common search space is defined in the PDCCH and the ePDCCH in one subframe or the UE-specific search space is defined in the resource regions of the PDCCH and the ePDCCH in one subframe, when one search space is partitioned, the number of candidates searched by the UE may be decided with respect to each search space by controlling the CCE aggregation level and the position of the candidate. Such a method may be used in a search space setting scenario of the subframe that performs the partitioning like subframe setting methods 6, 9, 12, 13, 14, 15, and the like of Table 1.

Figure 13:
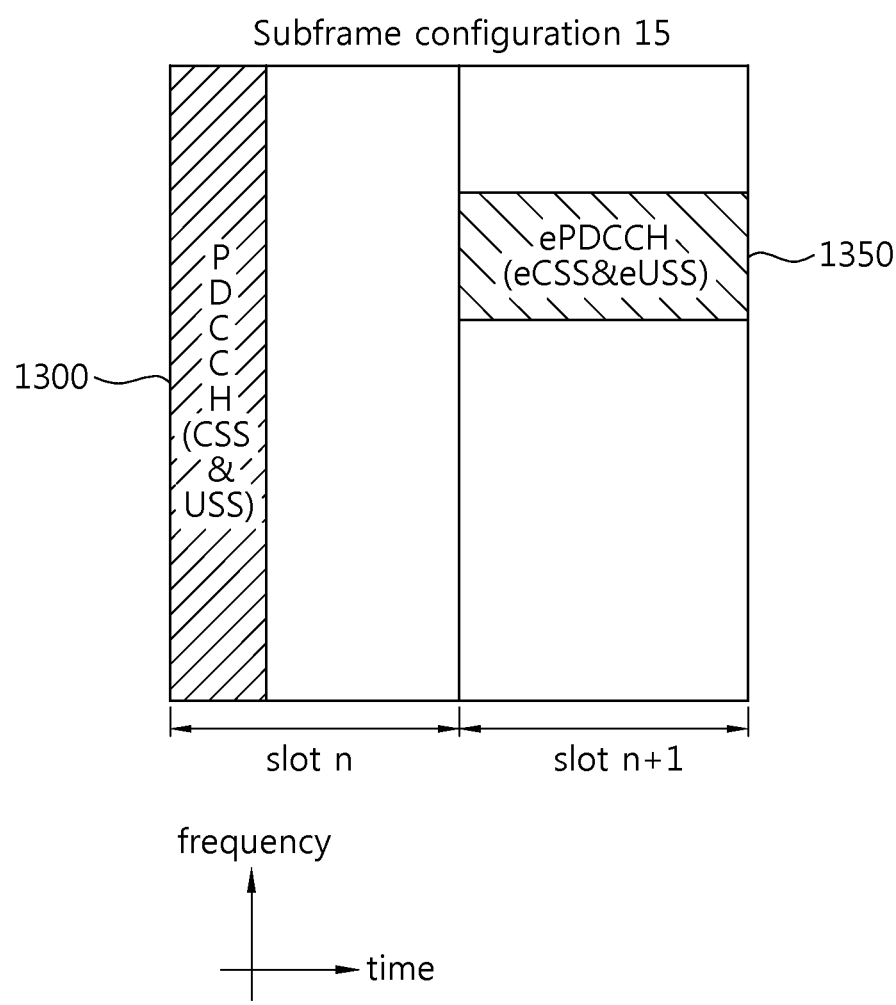
FIG. 13 is a conceptual diagram illustrating subframe setting method 15 of Table 5.

FIG. 13 is a conceptual diagram illustrating subframe setting method 15 of Table 5.

In the subframe setting method 15, all of the CSS, the USS, the eCSS, and the BUSS are configured to be set and transmitted in the subframe. That is, the CSS and the USS are set in a PDCCH 1300 of the subframe and the eCSS and the BUSS are set in an ePDCCH 1350 of the subframe to be transmitted. In the case of the subframe, the control information may be transmitted to the UE by using various CCE aggregation level setting methods and the method for dividing the number of candidates for each search space.

Figure 14:
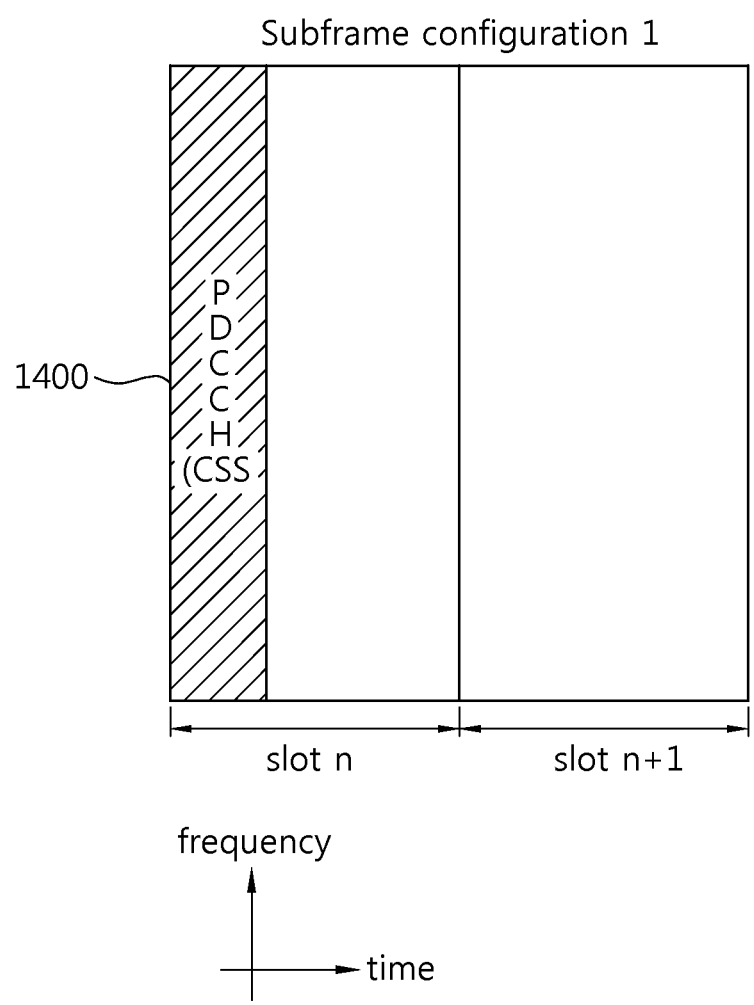
FIG. 14 is a conceptual diagram illustrating subframe setting method 1 of Table 5.

FIG. 14 is a conceptual diagram illustrating subframe setting method 1 of Table 5.

In the case of the subframe setting method 1, only the common search space is defined in a PDCCH 1400. When only the common search space is defined in the PDCCH 1400, the base station may not transmit the UE-specific control information to the UE. Accordingly, the base station transmits the subframe set like the subframe setting method 1 to the UE together with the subframe transmitting the UE-specific control information to transmit the UE-specific control information.

Figure 15:
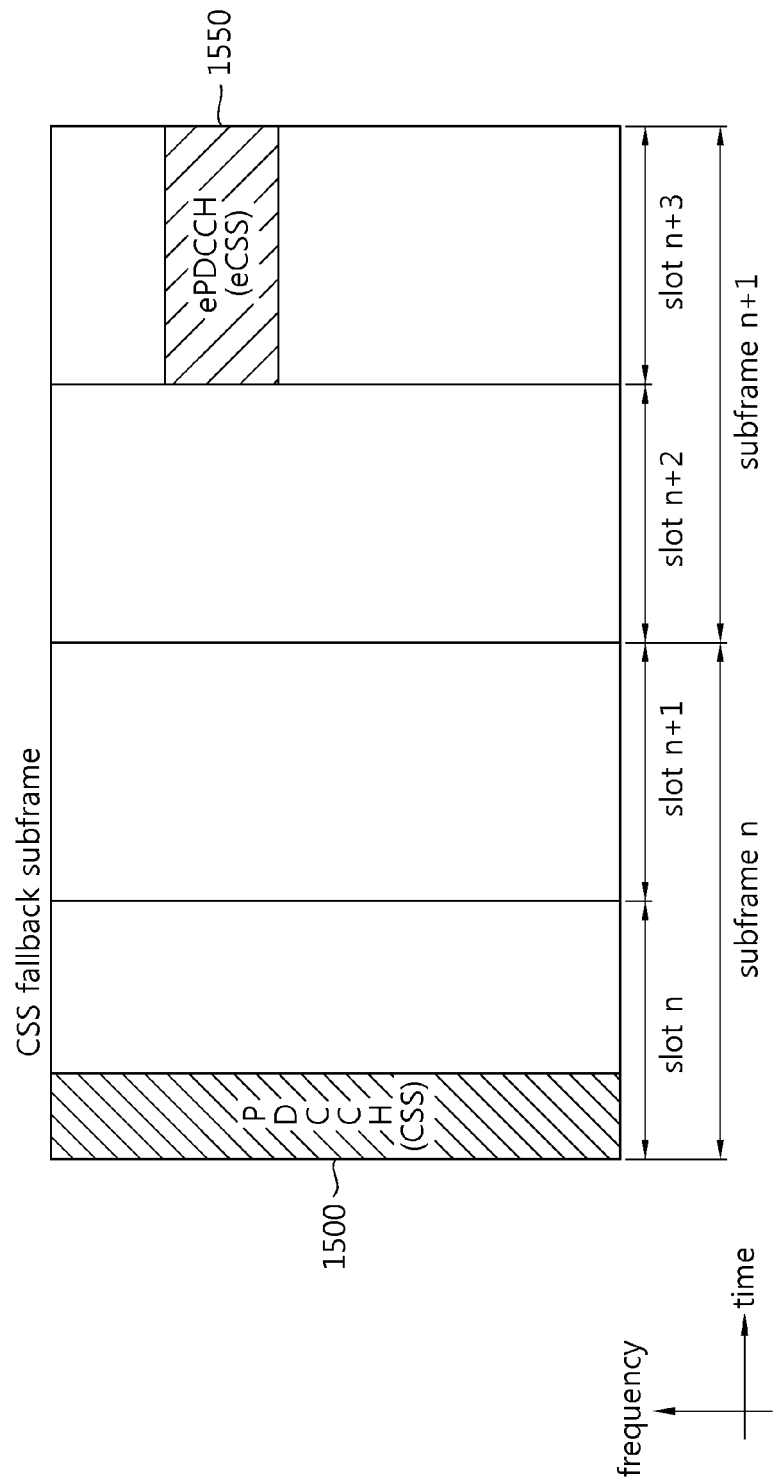
FIG. 15 is a conceptual diagram illustrating subframe setting methods 1 and 4 of Table 5.

FIG. 15 is a conceptual diagram illustrating subframe setting methods 1 and 4 of Table 5.

For example, the base station sets the first subframe by the subframe setting method 1 to transmit the set first subframe to the UE. The second subframe which is a subframe transmitted next to the first subframe is set by the subframe setting method 4 to be transmitted to the UE. Then, the subframe setting method 4 is the same as separating and performing the setting of the subframe such as the subframe setting method 7 on a time domain through two subframes.

When the subframes of the subframe setting method 1 and the subframe setting method 4 are combined with each other, the common search space may be changed by the unit of the subframe in one frame. The UE may search the common search space of a PDCCH 1500 in one subframe and search the UE-specific search space of an ePDCCH 1550 in the subsequent subframe. Since the UE may not receive the control information through the PDCCH 1500 in one heterogeneous network (HetNet), setting in which the subframes of the subframe setting method 1 and the subframe setting method 4 are combined may be usefully used when the control information should be received through the ePDCCH 1550.

Further, the subframe of the subframe setting method 1 may be used as a CSS fallback subframe in a link failure, an RRC configuration ambiguity period, and the like. For example, when the UE may not acquire the control data through the eCSS, the UE may acquire the control data through the CCS fallback subframe set by the subframe setting method 1 which is periodically transmitted.

When setting the subframe of the subframe setting method 2 is used together with another scenario (for example, the subframe setting method 4) in the similar manner, the subframe of the subframe setting method 2 may be used as a USS fallback subframe.

Figure 16:
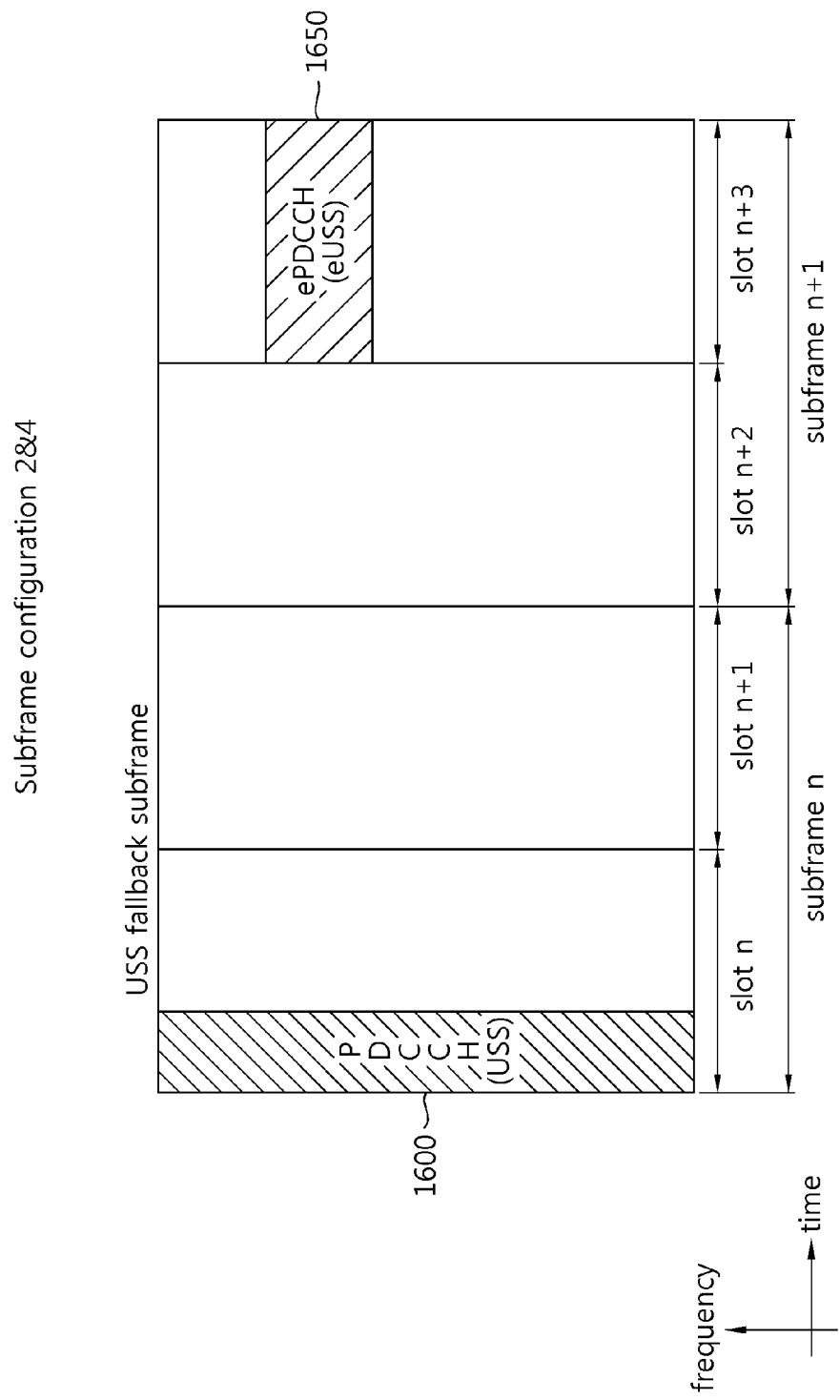
FIG. 16 is a conceptual diagram illustrating subframe setting methods 2 and 4 of Table 5.

FIG. 16 is a conceptual diagram illustrating subframe setting methods 2 and 4 of Table 5.

Referring to FIG. 16, when the UE may not acquire the control data through the eUSS, the UE may acquire the control data through the USS set in the USS fallback subframe created by the subframe setting method 2.

Figure 17:
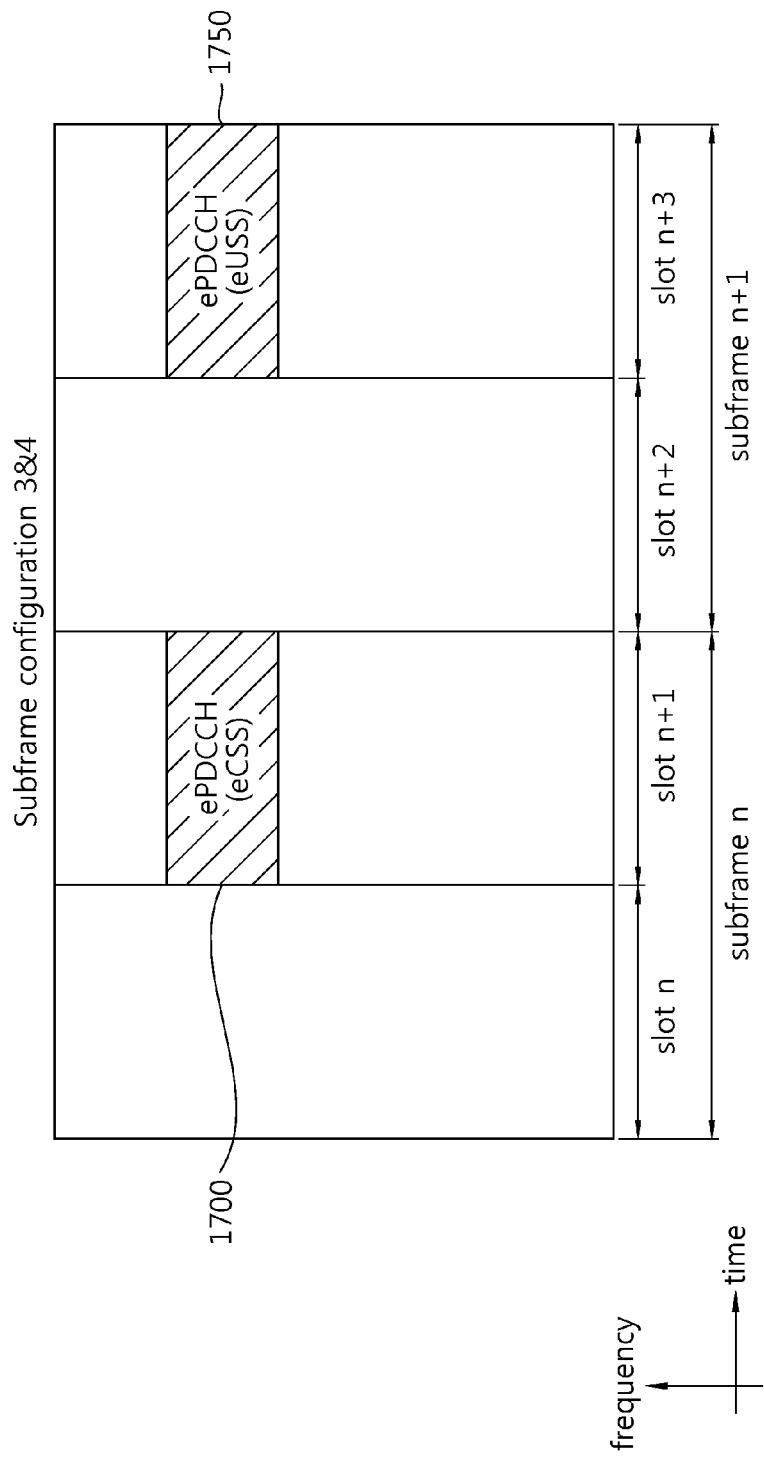
FIG. 17 is a conceptual diagram illustrating subframe setting methods 3 and 4 of Table 5.

FIG. 17 is a conceptual diagram illustrating subframe setting methods 3 and 4 of Table 5.

When only the eCSS is defined in an ePDCCH 1700 in the subframe setting method 3, only the eUSS is defined in the ePDCCH 1750 in the subframe setting method 4. That is, when the UE receives the subframe of the subframe setting method 3, the UE may search the eCSS of the ePDCCH 1700 and when the UE receives the subframe of the subframe setting method 4, the UE may search the eUSS of the ePDCCH 1750. In this case, the base station may transmit to the UE a frame combined with a subframe of another subframe setting method. When the subframes of the subframe setting method 3 and the subframe setting method 4 are combined, the subframes in which the common search space and the UE-specific search space are defined may be alternately transmitted to the UE. The base station may transmit the subframe of the subframe setting method 3 in a predetermined specific subframe among the frames.

As another exemplary embodiment, two scenarios are combined to set the CCE aggregation level and the position of the candidate for the search space. For example, when the subframe setting method 3 and the subframe setting method 4 are combined in one subframe, the subframe becomes the same subframe as the subframe of the subframe setting method 10. The eCSS and the eUSS may be distinguished according to the CCE aggregation level and/or the position of the candidate used in both search spaces in order to distinguish the eCSS and the eUSS defined in the ePDCCH. For example, the CCE aggregation level used in the eCSS and the CCE aggregation level used in the eUSS may be set to be different from each other.

In the subframe setting method 5, only the PDCCH is defined in the subframe. The subframe created by the subframe setting method 5 is the same as a legacy subframe in which the ePDCCH is not defined. The UE that receives the subframe of the subframe setting method 5 may perform the same demodulation operation as the existing legacy UE. The base station may transmit the subframe of the subframe setting method different from the subframe of the subframe setting method 5, which is included in one frame to transmit the subframe included in one frame to the UE. In this case, the subframe of the subframe setting method 5 may be used with being regarded as a PDCCH fallback subframe. For example, the UE receives the control data through the ePDCCH and operates in the fallback mode in the subframe created based on the subframe setting method 5 to acquire the control data.

The UE may perform the blind decoding differently from a manner of performing the blind decoding in the subframe including the existing PDCCH in the fallback subframe. That is, the UE sets the aggregation level and the position of the candidate in the fallback subframe differently from the legacy subframe to perform the blind decoding.

For example, in the case of the legacy subframe defining only the existing PDCCH, the UE performs 32-times blind decoding in the USS and 12-times blind decoding in the CSS in total 44 blind decoding times. However, in the fallback subframe, the number of times of the blind decoding for searching one search space of the USS and the CSS is more concentratively given without limiting the number of blind decoding times or various settings of the number of blind decoding times for the search space such as setting the number of even blind decoding times for two search spaces, and the like is different from the existing setting to perform the blind decoding.

As another method, a specific CCE aggregation method may not be used for the search space. The UE sets more candidates are set for residual CCE aggregation methods other than a CCE aggregation method which is not used to perform the blind decoding. The base station combines the subframe which may be used as the fallback subframe by the subframe setting method 5 with subframes created by various other subframe setting methods and creates the combined subframes into one frame to transmit one created frame to the UE.

Figure 18:
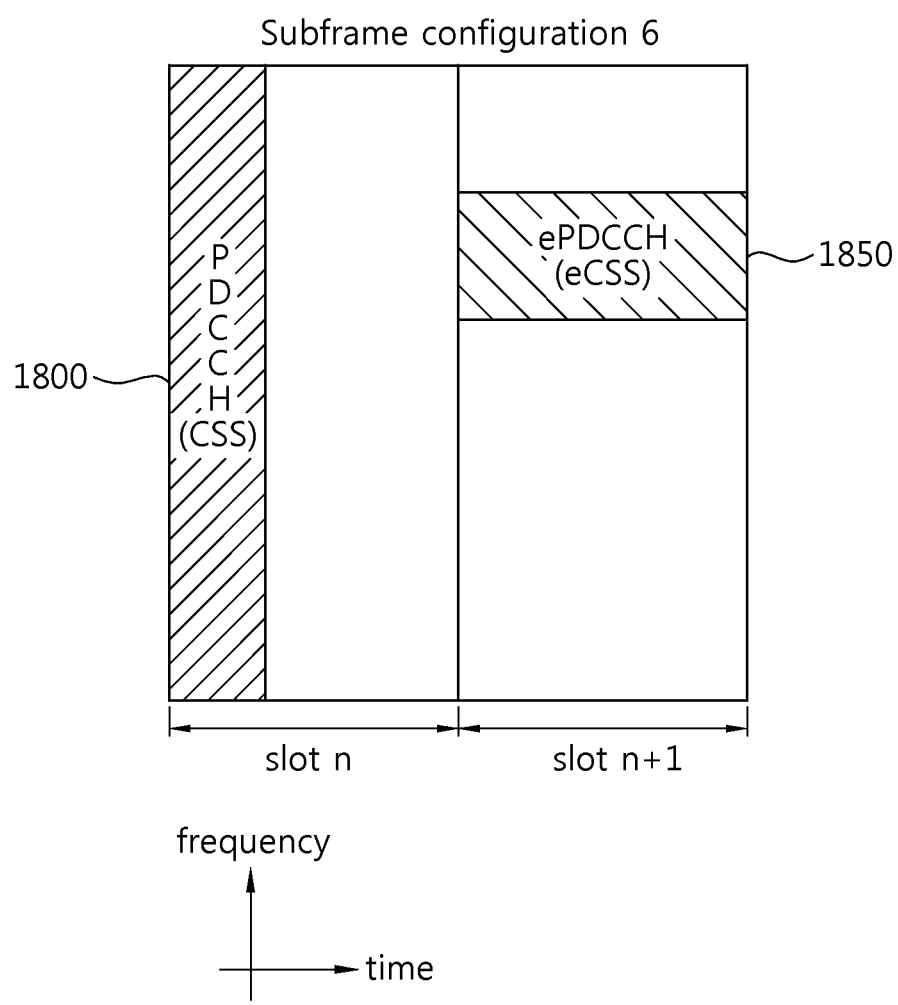
FIG. 18 is a conceptual diagram illustrating subframe setting method 6 of Table 5.

FIG. 18 is a conceptual diagram illustrating subframe setting method 6 of Table 5.

In the subframe setting method 6, the CSS is set in a PDCCH 1800 of the subframe and the eCSS is set in an ePDCCH 1850. Even in the subframe setting method 6, the CCE aggregation method and the position of the candidate for the search space may be controlled. The CSS and the eCSS may be used by defining aggregation levels and the positions of the candidates which are the same as each other or different from each other in the search space.

For example, in the case of the eCSS, only some aggregation levels of the aggregation levels are used and the position of the candidate for the aggregation level is also defined as a relatively smaller number than the CSS to be used.

Figure 19:
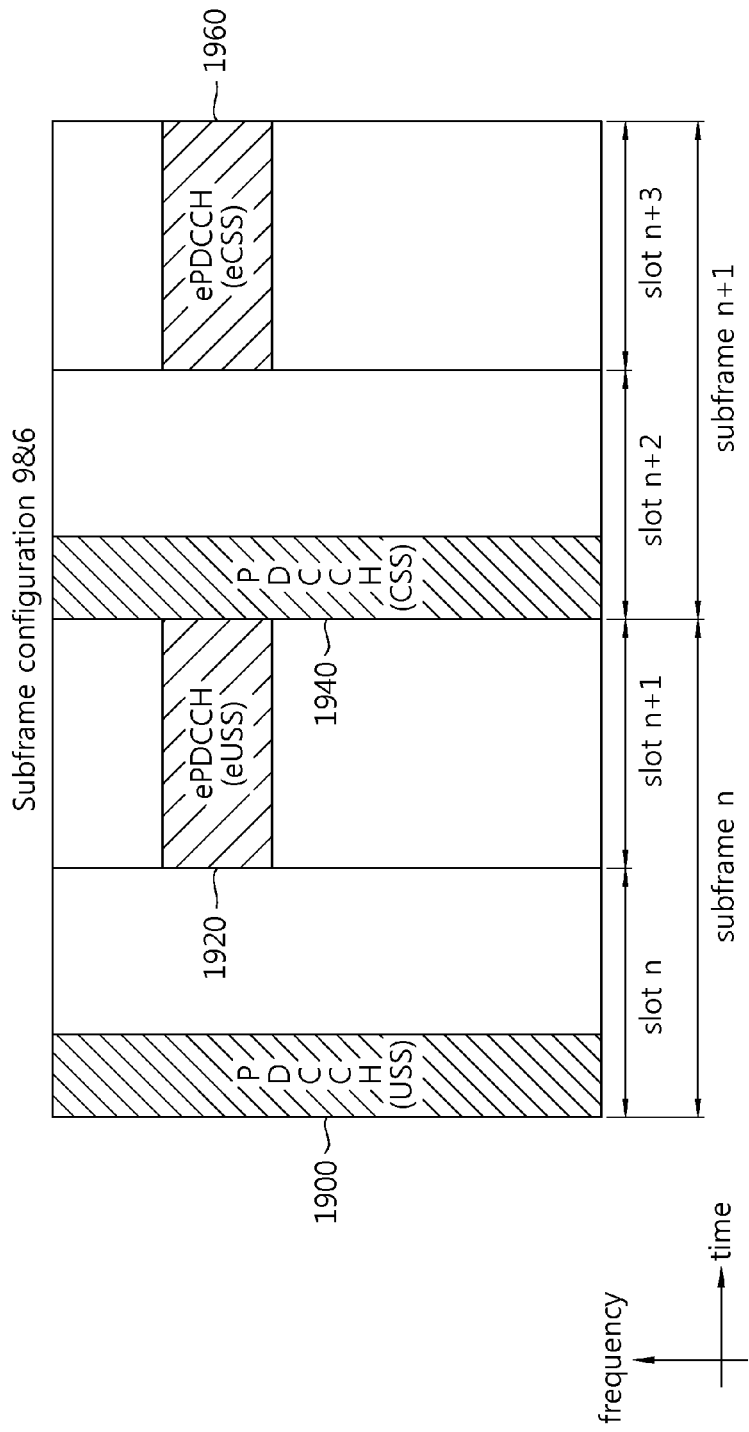
FIG. 19 is a conceptual diagram illustrating subframe setting methods 9 and 6 of Table 5.

FIG. 19 is a conceptual diagram illustrating subframe setting methods 9 and 6 of Table 5.

The base station may combine and transmit subframes of the subframe setting method 9 and the subframe setting method 6. The subframe of the subframe setting method 9 is a subframe that the USS and the eUSS in a PDCCH 1900 and an ePDCCH 1920, respectively and the subframe of the subframe setting method 6 is a subframe that sets the USS and the eUSS in a PDCCH 1940 and an ePDCCH 1960, respectively.

The UE receives the subframe of the subframe setting method 6 to receive the common control information through the CSS and the eCSS. Further, the UE receives the subframe of the subframe setting method 9 transmitted subsequently to the subframe of the subframe setting method 6 to receive the UE-specific control information from the USS and the eUSS.

Figure 20:
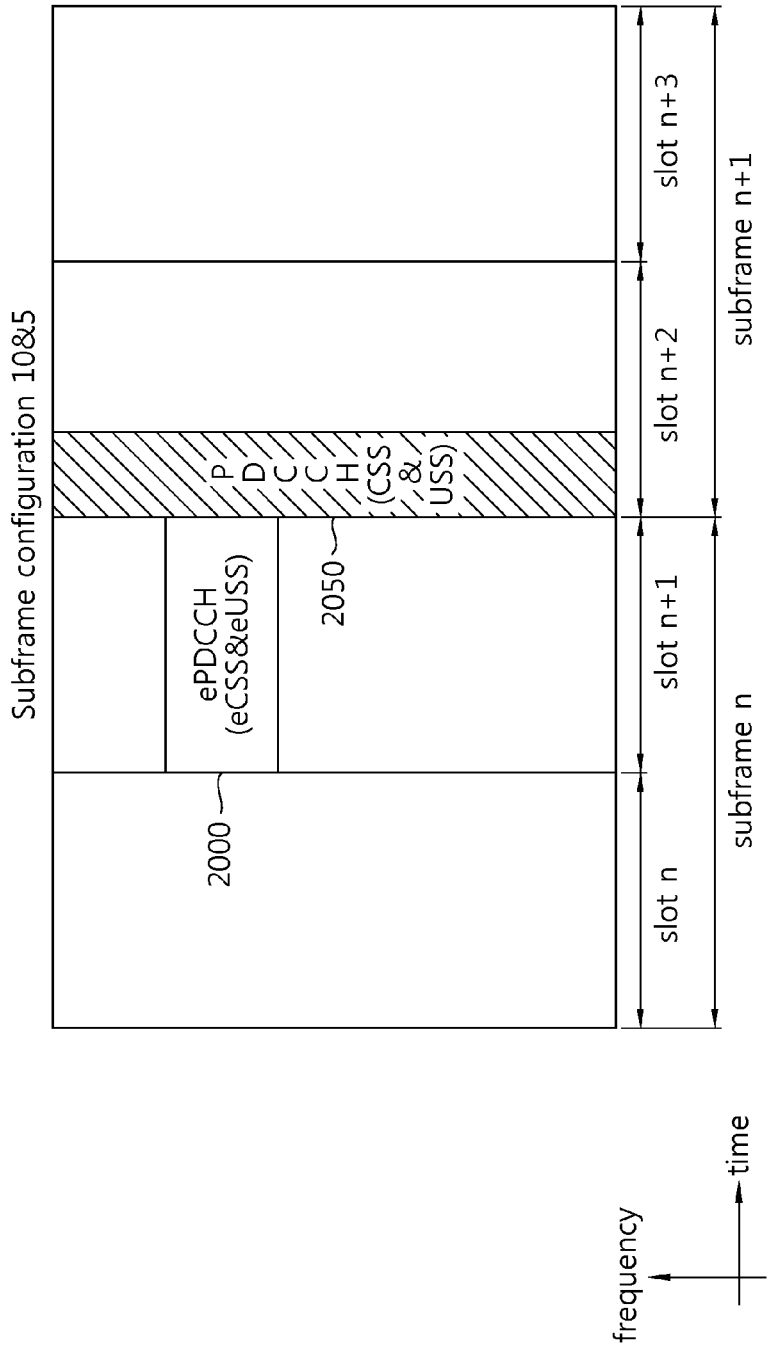
FIG. 20 is a conceptual diagram illustrating a subframe setting method of Table 5.

FIG. 20 is a conceptual diagram illustrating a subframe setting method of Table 5.

In the subframe setting method 10, the eCSS and the eUSS are set and transmitted for an ePDCCH 2000. The base station may transmit to the UE one frame including the subframe of the subframe setting method 10 and the subframe of the subframe setting method 5. The subframe of the subframe setting method 5 is a subframe that sets the CSS and the USS in a PDCCH 2050. When the subframe setting method 10 and the subframe setting method 5 are combined, the base station may transmit the control data to the UE through the first subframe that sets the eCSS and the eUSS and transmit the control data to the UE through the second subframe that sets the CSS and the US.

Figure 21:
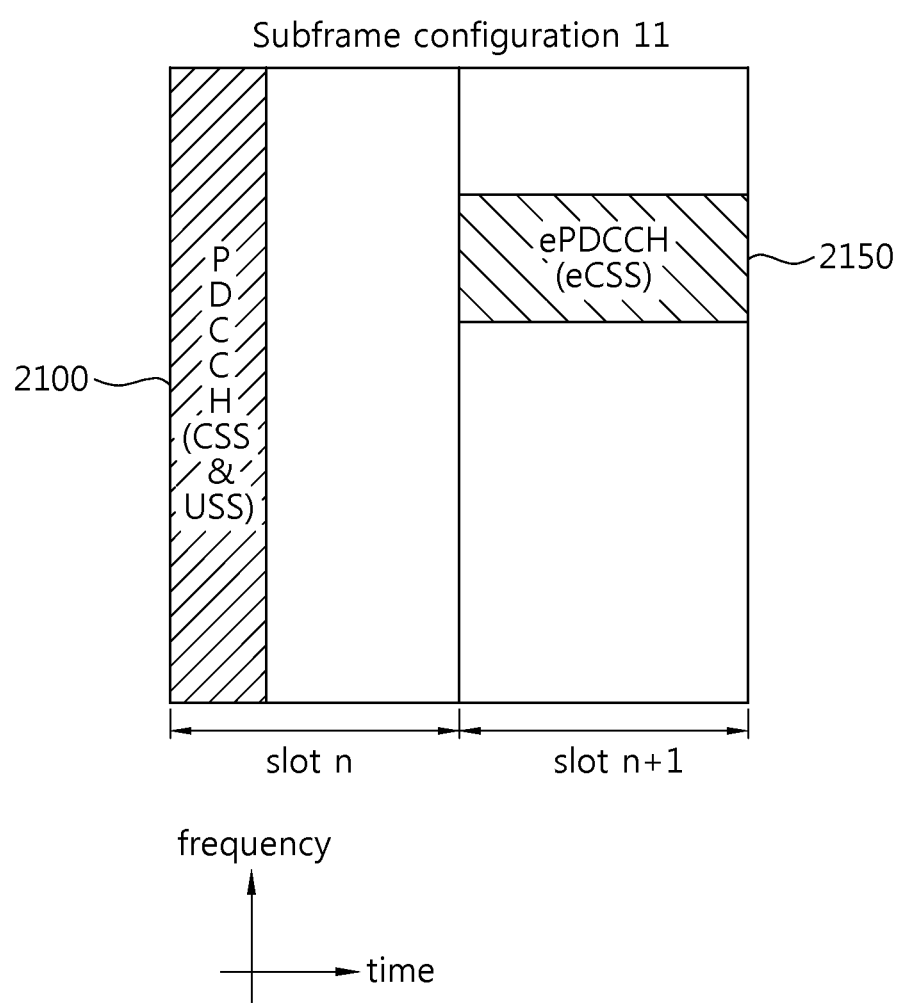
FIG. 21 is a conceptual diagram illustrating subframe setting method 11 of Table 5.

FIG. 21 is a conceptual diagram illustrating subframe setting method 11 of Table 5.

When the CSS for transmitting the control data in a PDCCH 2100 of a subframe of the subframe setting method 11 is short, the control data may be transmitted through the eCSS of an ePDCCH 2150. In this case, the number of blind decoding times assigned to the USS may be reduced and the additional number of blind decoding times may be assigned to the eCSS. That is, in the subframe of the subframe setting method 11, for example, the aggregation level and the position of the candidate are limited in the UE-specific search space to ensure the aggregation level and the position of the candidate of the eCSS.

Figure 22:
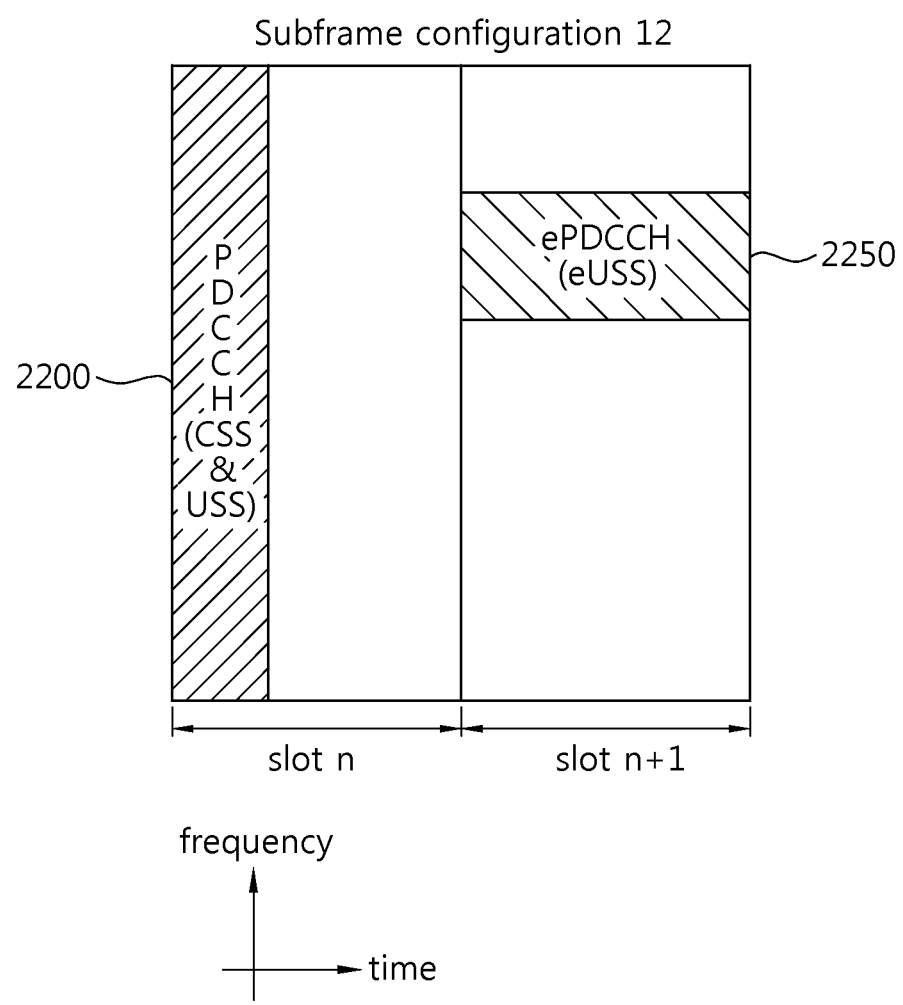
FIG. 22 is a conceptual diagram illustrating subframe setting method 12 of Table 5.

FIG. 22 is a conceptual diagram illustrating subframe setting method 12 of Table 5.

A subframe of the subframe setting method 12 may set the common search space and the UE-specific search space in a PDCCH 2200 and set the UE-specific search space in an ePDCCH 2250. In the subframe of the subframe setting method 12, common control information such as system information in which the plurality of UEs demodulate in the control information may be transmitted to the common search space of the PDCCH 2200 which is safely designed.

Residual UE-specific control information may be transmitted through the USS of the PDCCH 2200 and the eUSS of the ePDCCH 2250. The UE-specific information is transmitted through the ePDCCH 2250 to increase a resource region for transmitting the common control information in the PDCCH 2200.

Further, in the subframe of the subframe setting method 12, the aggregation level and the position of the candidate are controlled between the UE-specific search space of the PDCCH 2200 and the UE-specific search space of the ePDCCH 2250, and as a result, the UE may effectively perform the blind decoding.

Figure 23:
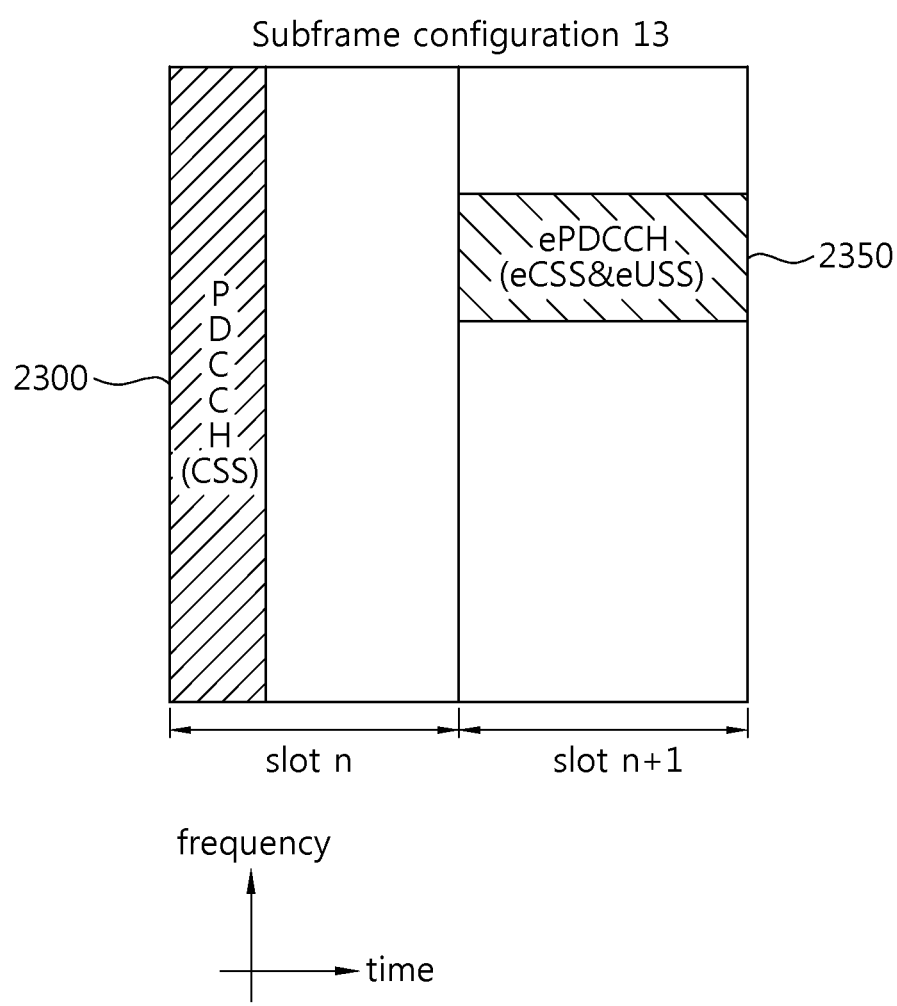
FIG. 23 is a conceptual diagram illustrating subframe setting method 13 of Table 5.

FIG. 23 is a conceptual diagram illustrating subframe setting method 13 of Table 5.

A subframe of the subframe setting method 13 may set the CSS in a PDCCH 2300, and set the eCSS and the eUSS in an ePDCCH 2350. In the subframe of the subframe setting method 13, the common search space is set in the PDCCH 2300 and the ePDCCH 2350 to transmit the common control information through the PDCCH 2300 and the ePDCCH 2350. The subframe of the subframe setting method 13 may be regarded as a subframe for the base station to transmit the control information based on the eCSS and the eUSS in the ePDCCH 2350 and additionally transmit the common control information to the UE through the CSS of the PDCCH 2300. Even the subframe of the subframe setting method 13 may adjust the aggregation level and the position of the candidate between the CSS region and the eCSS region similarly.

Figure 24:
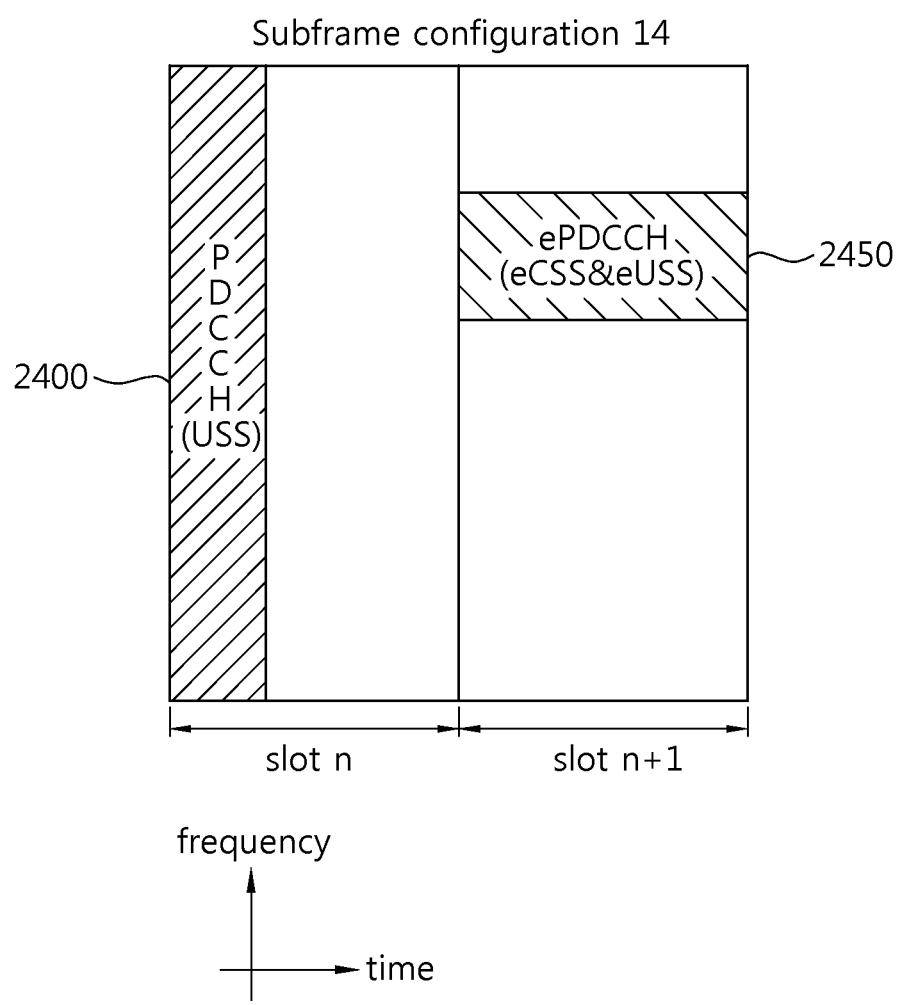
FIG. 24 is a conceptual diagram illustrating a subframe setting method of Table 5.

FIG. 24 is a conceptual diagram illustrating a subframe setting method of Table 5.

A subframe of the subframe setting method 14 may set the USS in a PDCCH 2400, and set the eCSS and the eUSS in an ePDCCH 2450. The base station sets the eCSS and the eUSS in the ePDCCH 2450 to transmit the control data to the UE and additionally sets the USS in the PDCCH 2400 to transmit the control data to the UE through the subframe of the subframe setting method 14. The subframe of the subframe setting method 14 may be used when the UE may not receive the control data transmitted through the common search space set in the PDCCH 2400 in a specific subframe. In the subframe of the subframe setting method 14, the aggregation level and the position of the candidate may be controlled between the USS and the eUSS.

In the search space of the ePDCCH of the subframe according to the exemplary embodiment of the present invention, the aggregation levels and the positions of the candidates of the eCSS and the eUSS may be adjusted. This may be applied to all subframes in which both the eCSS and the eUSS are set in the ePDCCH of the subframe like scenarios 10, 13, 14, and 15.

In the subframe setting methods 13, 14, and 15, the CSS or the USS may be defined even in the PDCCH of the subframe. In this case, the number of times of the blind decoding performed in the CSS or the USS of the PDCCH may be decided based on the aggregation level and the position of the candidate set in for the eCSS or the eUSS of the ePDCCH of the subframe. That is, the number of times of available blind decoding may be distributed according to the search space.

In the subframe setting methods 13, 14, and 15, on the contrary, the aggregation level and the position of the candidate set for the eCSS or the eUSS may be decided by considering the blind decoding capability of the UE based on the aggregation level and the position of the candidate set for the CSS or the USS of the PDCCH.

The subframe setting method disclosed in Table 1 is combined with another subframe setting method to be used. Individual subframe setting methods are selected as necessary to configure the frame. The base station may transmit to the UE a frame created by at least one subframe setting method according to conditions (a form of the subframe, the transmit mode, the DCI format, the position of the candidate, the aggregation level, and the like).

That is, subframes depending on a plurality of subframe setting methods may be created. Further, the subframe setting methods are divided into predetermined groups to be used for creating the frame for each corresponding group. For example, a first group is set to include the subframe setting methods 1, 3, and 5 among the subframe setting methods and a second group is set to include the subframe setting methods 2, 4, and 6 to create a frame created based on the subframe setting methods included in the first group at the time of creating one frame and create a frame created based on the subframe setting methods included in the second group at the time of creating another frame.

The subframes created by using the plurality of subframe setting methods are included in one frame to be transmitted.

Figure 25:
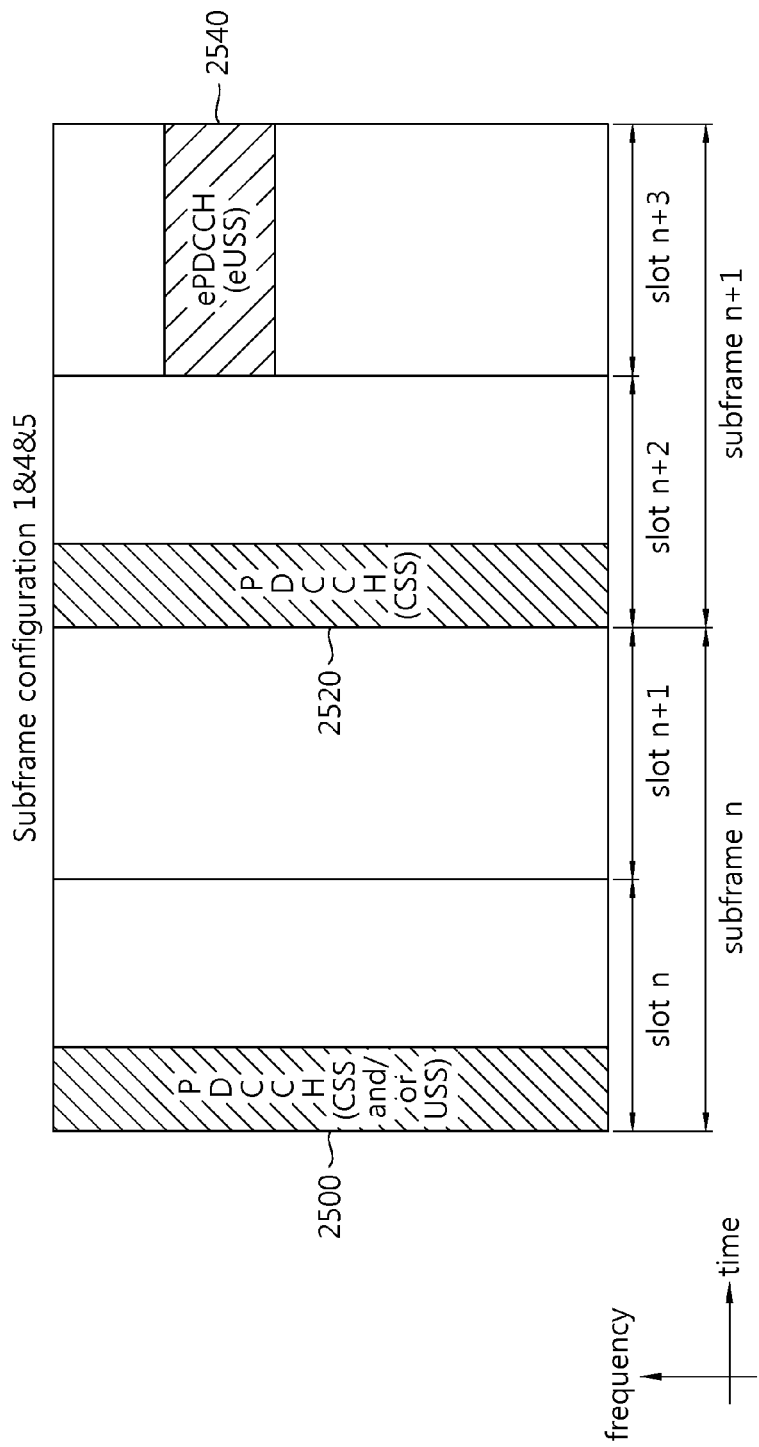
FIG. 25 is a conceptual diagram illustrating a subframe setting method of Table 5.

FIG. 25 is a conceptual diagram illustrating a subframe setting method of Table 5.

As one of combinations of the subframe setting methods, the subframes created based on the subframe setting method 1, the subframe setting method 4, and the subframe setting method 5 may be transmitted through one frame. The first subframe as the subframe created based on the subframe setting method 5 and the second subframe transmitted after the first subframe as a the subframe created based on the subframe setting method 1 may be a subframe that sets the CSS in the PDCCH 2520 or as the subframe created based on the subframe setting method 4 may be a subframe that sets the eUSS in the ePDCCH 2540.

Figure 26:
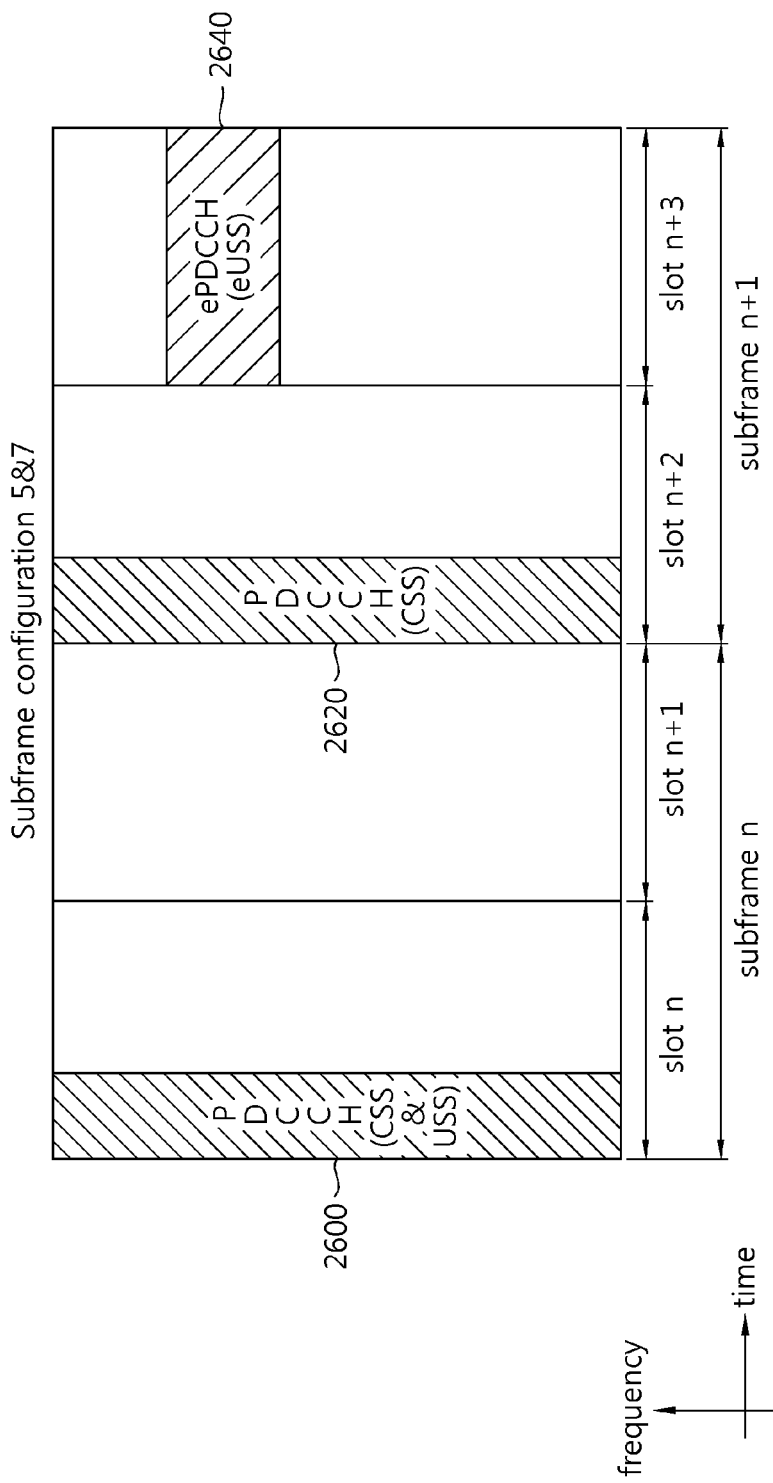
FIG. 26 is a conceptual diagram illustrating a subframe setting method of Table 5.

FIG. 26 is a conceptual diagram illustrating a subframe setting method of Table 5.

As one of combinations of the subframe setting methods, the subframe setting method 5 and the subframe setting method 7 may be combined. In this case, the UE may acquire the control information through the CSS and the USS defined in the PDCCH 2600 in the first subframe and acquire the control information through the CSS defined in the PDCCH 2620 and the USS defined in the ePDCCH 2640 in the second subframe. The combination of the subframe setting methods may be used in a special subframe used in a TDD mode.

Since resources defined to transmit data through a downlink are short in the special subframe, there is a high possibility that the CSS set in the ePDCCH will not be present. Accordingly, the base station may transmit the control data to the UE based on the USS set in the PDCCH without using the CSS set in the ePDCCH. That is, the UE may acquire the control information through the common search space and the UE-specific search space defined in the PDCCH of the special subframe, and acquire the control data through the CSS of the ePDCCH in not the special subframe but the normal subframe.

An operation of the UE in the special subframe may be conditionally changed. In the special subframe, an operation mode may be changed depending on whether the quantity of available resources used as a control channel being equal to or more than or equal to or less than a threshold value. For example, as the case in which the available resources are sufficient in the special subframe to be equal to or more than the threshold value, a case in which a UE-specific control region may be transmitted may be assumed. In this case, the UE monitors the eUSS set in the ePDCCH to acquire the control data. However, when the available resources in the special subframe is equal to or less than the threshold value (for example, when the length of DwPTS is set to 3 OFDM or less), the UE may acquire the control data by monitoring the USS of the PDCCH. The UE may decide a channel to receive the control data based on a value (for example, an appropriate quantity of available resources, a threshold value) previously defined between the base station and the UE.

Meanings of the CSS and the eCSS defined in the PDCCH and the ePDCCH used in the exemplary embodiment of the present invention may have a meaning of a search space that transmits cell specific information and a meaning of a search space that transmits control data received by all UEs in the cell.

Another expressions instead of expressions of the CSS and the USS may be divided even depending on a type of an enhanced control channel element (eCCE) constituting the search space. The subframe setting method may be divided based on a table configured by substituting the CSS with a distributed eCCE (D-eCCE) and the USS with a localized eCCE (L-eCCE). The D/L-eCCE may be described as one of a mapping mode.

As necessary in order to use the combination of the subframe setting methods, the base station may signal the combination of the subframe setting methods to the UE. In the case of using one subframe setting method aggregation in order to create the frame, the UE may transmit information on the combination of the subframe setting methods to the UE through one-time signaling at an initial stage. Even when the base station intends to change the subframe setting method aggregation, the base station may transmit change information of the subframe setting method aggregation to the UE through additional signaling.

When the system is operated by combinations of various subframe setting methods, setting information suitable for the subframe may be signaled on an upper layer and the base station may create the subframe based on the setting information suitable for the subframe and transmit the created subframe to the UE. As another method, one or more available subframe settings are given to a specific subframe and dynamically applied to create the subframe. For example, the special subframe enables one or more subframe settings and one subframe setting is selected depending on a situation of the system to transmit the special subframe. The base station may decide which setting the special subframe is to be created by the signaling of the upper layer, but may inherently select and use the setting of the special subframe without additional signaling.

In a subframe that transmits PBCH data, resource elements that transmit PDSCH data may be short due to resource elements that transmit the PBCH data. The subframe that transmits the PBCH data does not set the ePDCCH but sets only the PDCCH to transmit the control data. The UE monitors only the PDCCH in the subframe that transits the PBCH data to acquire the control information.

The UE subdivides the eCSS and/or the eUSS set in the ePDCCH and the CSS and/or the USS set in the PDCCH to perform monitoring. For example, the control data transmitted in the common search space may be monitored in a time division mode as a mode of monitoring the CSS set in the PDCCH in the first subframe and the eCSS set in the ePDCCH in the second subframe.

In the exemplary embodiment of the present invention, setting the PDCCH and the ePDCCH is described in the subframe. In the subframe, the relationship of the PHICH and the ePHICH may also be set similarly as the relationship of the PDCCH and the ePDCCH. For example, a subframe including only the PHICH is used as a fallback PHICH subframe, and as a result, the UE operates in the fallback mode in the corresponding subframe to acquire the PHICH data.

In a method for setting the PHICH and the ePHICH in the subframe, only the PHICH may be set and transmitted in a specific subframe, only the ePHICH may be set and transmitted in another subframe, and both the PHICH and the ePHICH may be simultaneously set and transmitted in yet another subframe. That is, the subframe setting methods are different to transmit the subframe.

Figure 27:
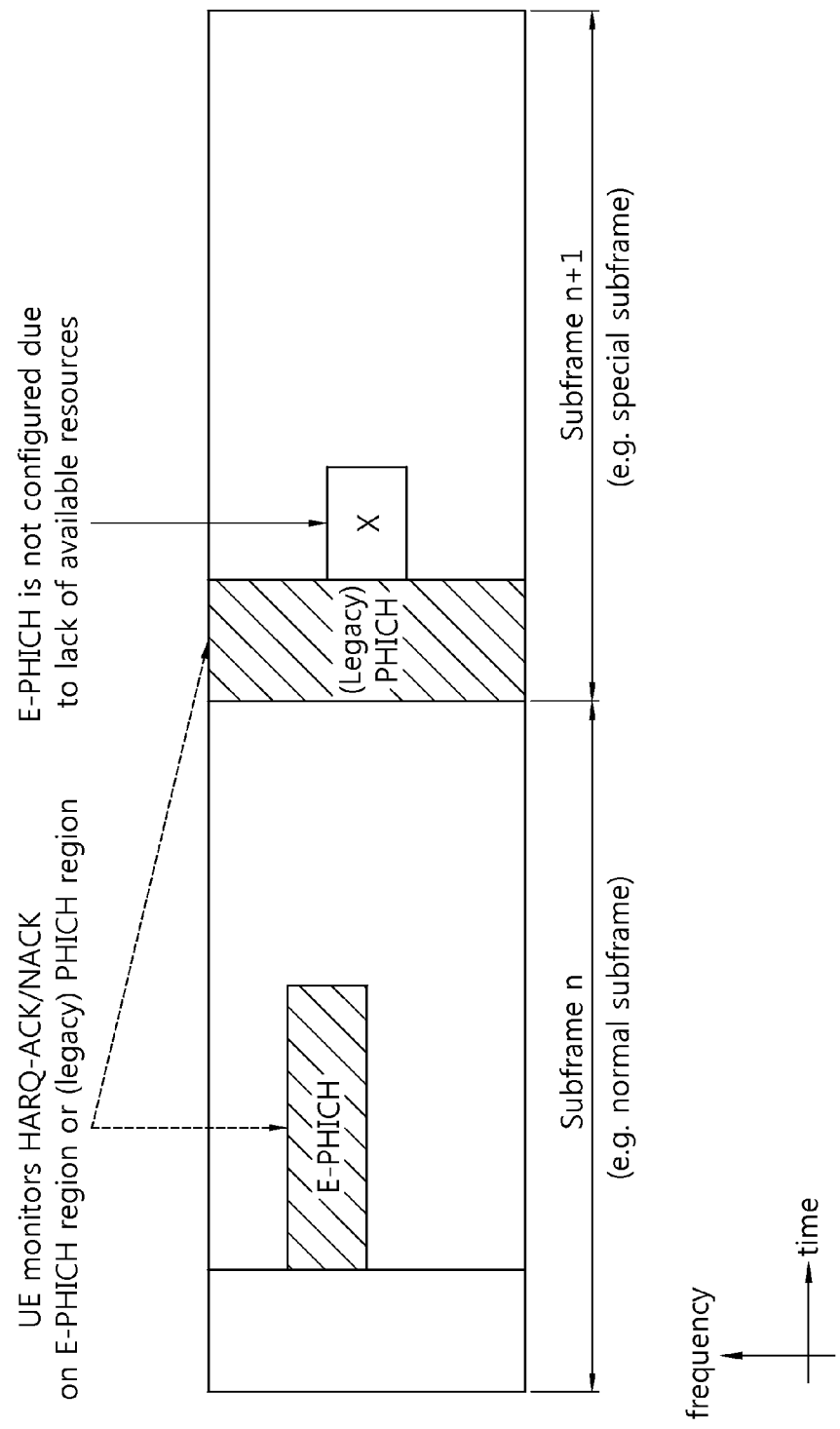
FIG. 27 is a conceptual diagram illustrating the case of setting and transmitting an ePHICH and a PHICH in each subframe according to the exemplary embodiment of the present invention.

FIG. 27 is a conceptual diagram illustrating the case of setting and transmitting an ePHICH and a PHICH in each subframe according to the exemplary embodiment of the present invention.

Referring to FIG. 27, the first subframe is a subframe that sets an ePHICH 2700 and the second subframe is a subframe that sets a PHICH 2750. The UE sets the second subframe as the fallback PHICH subframe to operate in the fallback mode in the second subframe.

The UE may adjust and change the position of an ePHICH data candidate and a CCE aggregation level by the unit of the subframe in monitoring the ePHICH data 2700. For example, resource regions in which the UE monitors the ePDCCH and the ePHICH 2700 may be duplicated with each other. In this case, the position of the candidate and the CCE aggregation level for performing the blind decoding of the ePDCCH data candidate and the ePHICH data candidate in the subframe, and as a result, the UE may perform the blind decoding for the subframe.

One subframe may include both the ePHICH 2700 and the PHICH 2750.

Figure 28:
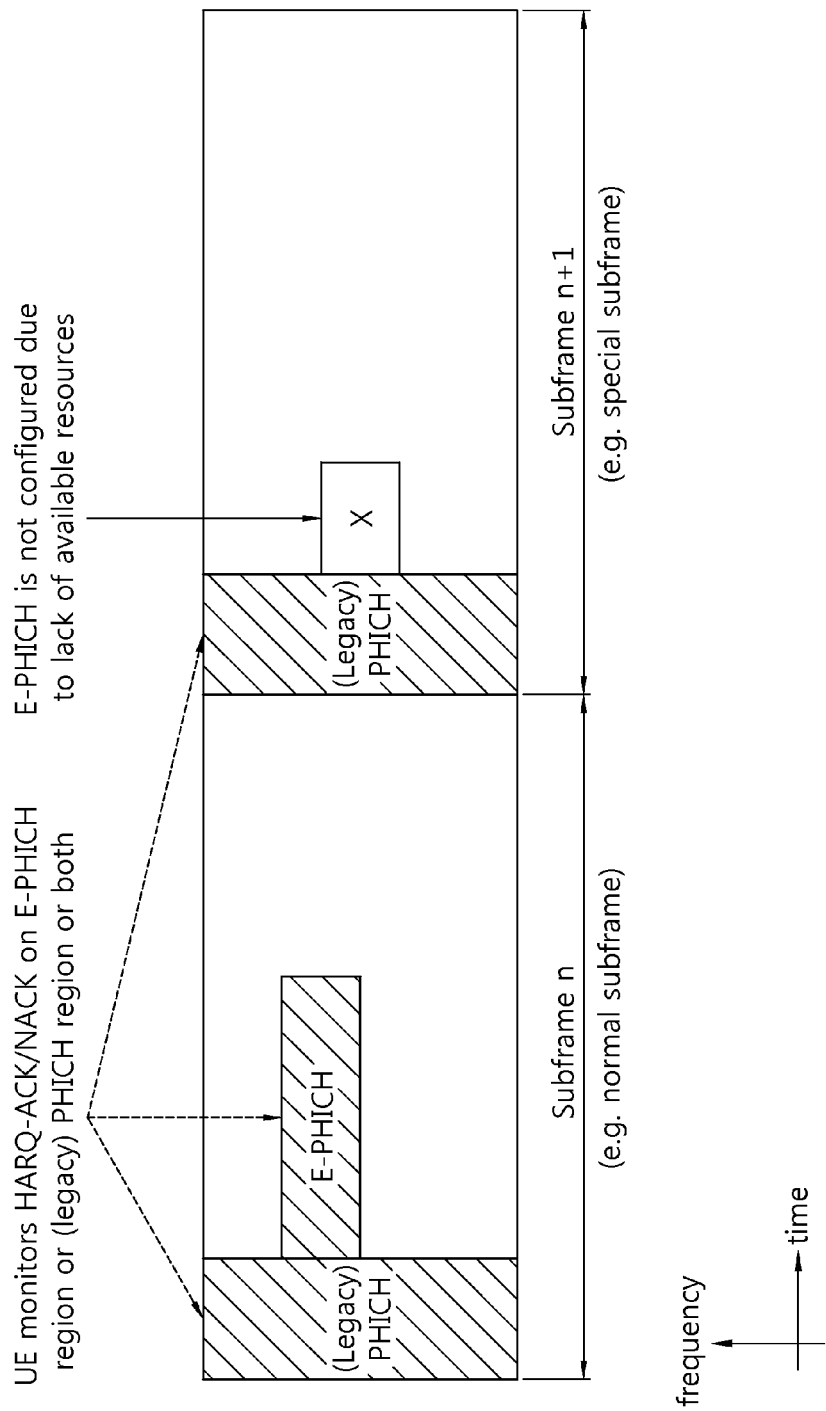
FIG. 28 is a conceptual diagram illustrating the case of setting and transmitting the ePHICH and the PHICH in one subframe according to the exemplary embodiment of the present invention.

FIG. 28 is a conceptual diagram illustrating the case of setting and transmitting the ePHICH and the PHICH in one subframe according to the exemplary embodiment of the present invention.

Referring to FIG. 28, the base station may set and transmit a PHICH 2800 and an ePHICH 2820 in the first subframe and set and transmit a PHICH 2840 in the second subframe.

Although the ePHICH 2820 is set in the subframe, the UE may perform monitoring based on TDM division. A method in which the UE monitors the ePHICH data of the subframe may be associated with a method in which the UE searches the ePDCCH data. For example, according to the eCSS being present in the ePDCCH of the subframe, the UE may decide whether to monitor the ePHICH 2820 of the subframe. Whether to monitor the ePHICH may be decided according to the common search space being present in the PDCCH and/or ePDCCH region.

Figure 29:
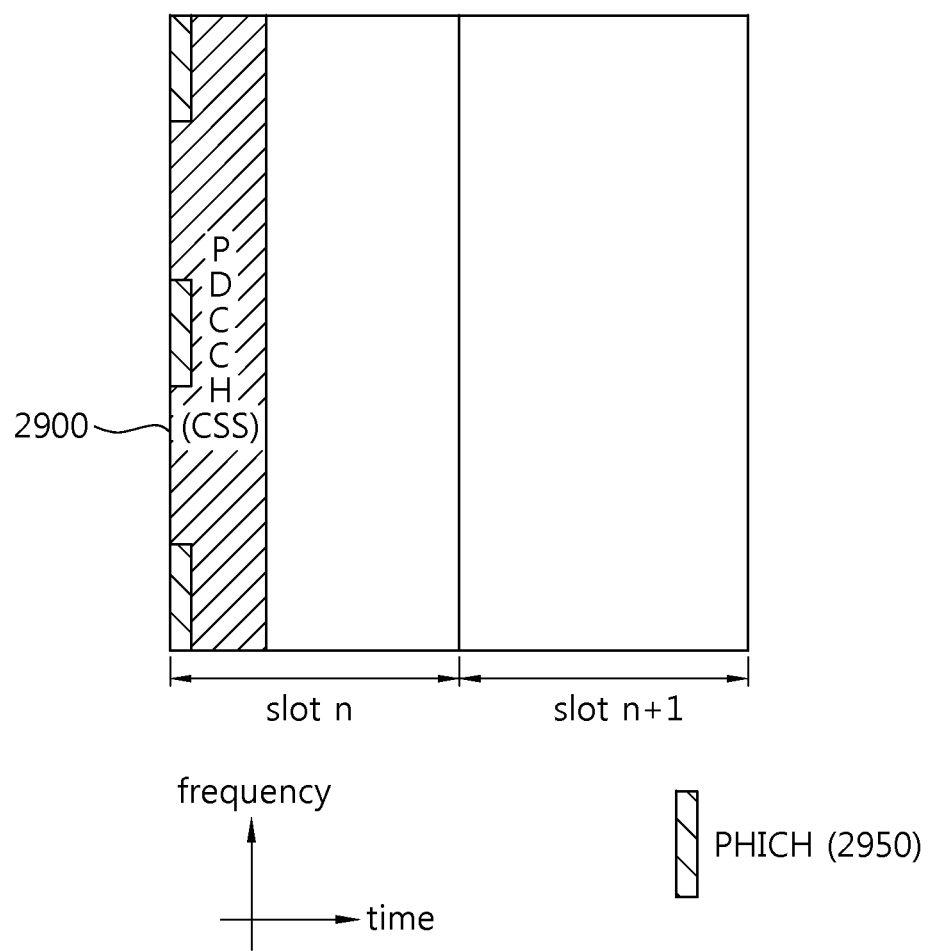
FIG. 29 is a conceptual diagram illustrating a subframe that transmits PHICH data according to the exemplary embodiment of the present invention.

FIG. 29 is a conceptual diagram illustrating a subframe that transmits PHICH data according to the exemplary embodiment of the present invention.

Referring to FIG. 29, the CSS is set in a PDCCH 2900 of the first subframe. In this case, the UE monitors a legacy PHICH 2950 to receive the PHICH data.

When the CCS is present in the PDCCH 2900 of the subframe, the UE receives the PHICH data through the legacy PHICH 2950 and it may be assumed that the ePHICH is not present in the subframe. Accordingly, a resource (indicating a resource reserved by a linkage or an RRC) which will be used if the ePHICH data was transmitted has no meaning longer, and as a result, the resource may be used to transmit other data. For example, the corresponding resource may be reused to transmit data such as the PDSCH data or transmit another control channel. Of course, since the UE need not monitor the ePHICH, the limited number of blind decoding times may not separately be used for blind-decoding the search space of the ePHICH.

When both the PHICH and the ePHICH are present and the common search space is present in both the PHICH and the ePHICH, the UE may search both search spaces.

Figure 30:
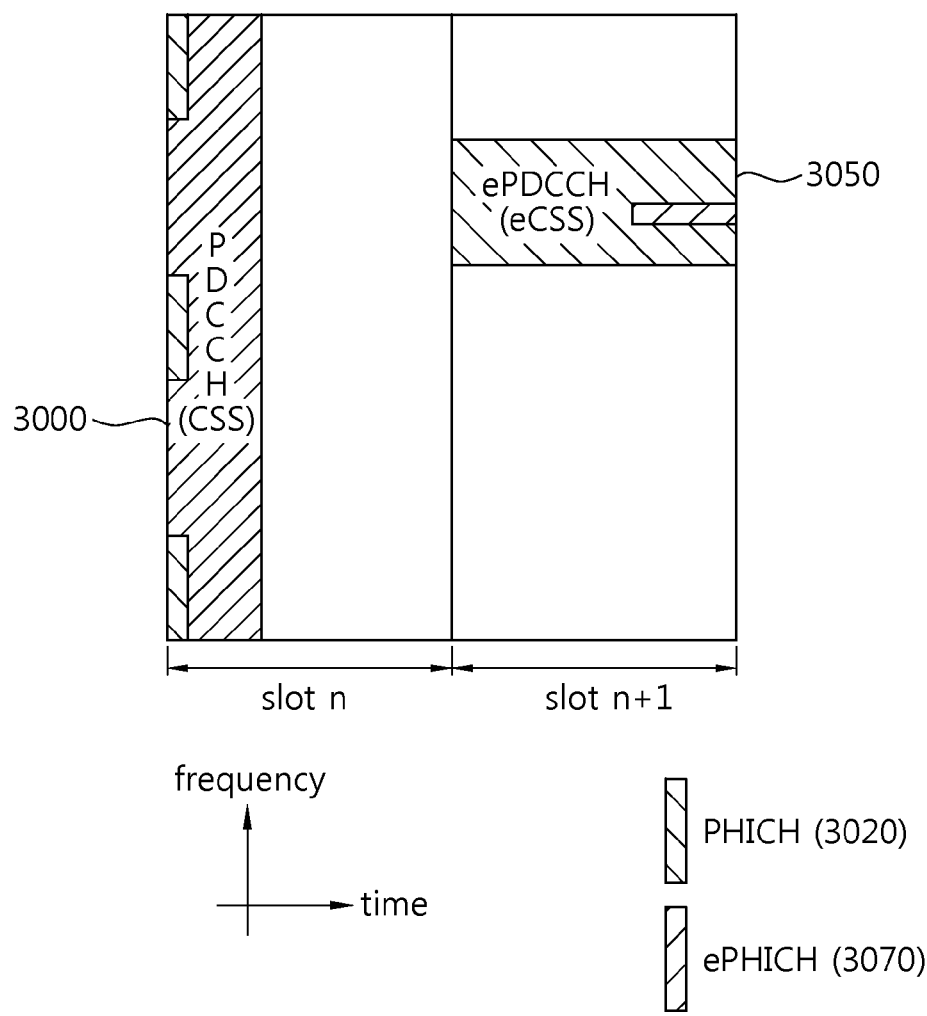
FIG. 30 is a conceptual diagram illustrating a subframe that transmits PHICH and ePHICH data according to the exemplary embodiment of the present invention.

FIG. 30 is a conceptual diagram illustrating a subframe that transmits PHICH and ePHICH data according to an exemplary embodiment of the present invention.

Referring to FIG. 30, the CSS and the eCSS are set in a PDCCH 3000 and an ePDCCH 3050, respectively. In this case, the PHICH and the ePHICH are set in the subframe to be transmitted.

The UE may monitor a legacy PHICH 3020 and monitor the ePHICH data 3070 in a subframe in which the CSS and the eCSS are set in the PDCCH 3000 and the ePDCCH 3050, respectively. The legacy PHICH data may be transmitted in a resource region used to transmit the existing PHICH data.

The UE may perform the blind decoding in order to acquire the ePHICH data 3070 and separately define a CCE aggregation level and the position of a candidate to monitor the ePHICH 3070. The ePHICH data 3070 may be transmitted through the resource region set to transmit the PDSCH data. The UE may acquire the ePHICH data 3070 by monitoring the common search space of the ePDCCH 3050. The UE may receive the ePHICH data 3070 by performing the blind decoding based on the CCE aggregation level set for blind-decoding the common search space. As another method, a space other than the common search space of the ePDCCH 3050 is set as the ePHICH data candidate to be transmitted.

Figure 31:
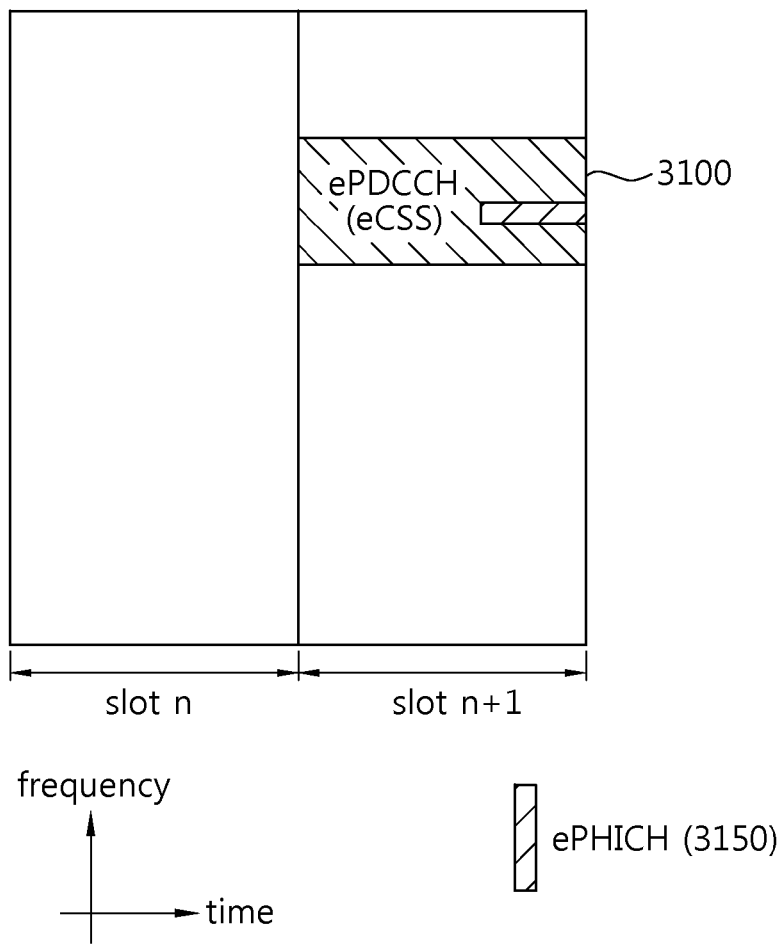
FIG. 31 is a conceptual diagram illustrating a subframe that transmits the ePHICH according to the exemplary embodiment of the present invention.

FIG. 31 is a conceptual diagram illustrating a subframe that transmits an ePHICH according to the exemplary embodiment of the present invention.

Referring to FIG. 31, the subframe may include the ePDCCH 3100. When the common search space is set in the ePDCCH 3100, the UE may acquire the ePHICH data 3150 by monitoring the ePHICH data 3150. The UE may, for example, blind-decode the common search space of the ePDCCH 3100 in order to acquire the ePHICH data 3150. That is, the UE may monitor the ePHICH when the common search space is present in the ePDCCH.

As described above, the base station may transmit the ePHICH data 3150 through the common search space of the ePDCCH 3100. In this case, a CCE aggregation level for monitoring the ePDCCH and a CCE aggregation level for monitoring the PDCCH may use different values. As yet another example, a start position of the ePDCCH data candidate to start monitoring the ePDCCH and a start position of the PDCCH data candidate to start monitoring the PDCCH may be different from each other. That is, the UE may monitor the ePDCCH and the ePHICH based on various CCE aggregation levels and positions of candidates.

As still another method, a space other than the common search space of the ePDCCH 3100 is set as the ePHICH data candidate to be transmitted.

Meanwhile, the UE may monitor the PDCCH or the ePDCCH in order to perform radio link monitoring (RLM). The RLM is a channel status measuring method that detects downlink quality of a serving cell set between base stations based on the reference signal such as the CRS. For example, the UE may perform the RLM for only a channel (for example, the PDCCH and/or the ePDCCH) in which the CSS is set. Since performing the RLM for both the PDCCH and the ePDCCH imposes a heavy burden to the UE, it is not preferable. The UE may perform the RLM by selecting one channel of both channels.

For example, the UE may determine whether to the RLM based on the CRS used to demodulate the PDCCH by considering how frequency or density the common search space of the PDCCH is transmitted at. The UE may use the PDCCH for the RLM only when the density of the common search space is at a predetermined level in the PDCCH. For example, the common search space of the PDCCH, which is included in subframe #0 which is a first subframe of the frame and subframe #5 which is a sixth subframe may be set. In this case, the UE may perform the RLM based on the PDCCH of the subframe received at an interval of 5 ms. In the case where the UE is difficult to perform the RLM based on the PDCCHA such as the case in which the common search space of the PDCCH is transmitted at the interval of 5 ms or more, the UE may perform the RLM by monitoring the ePDCCH.

That is, when the density of the common search space is smaller than a predetermined level in the PDCCH, the UE may perform the RLM based on the reference signal used to demodulate the ePDCCH instead of the PDCCH. As another method, the RLM may be performed based on the PDCCH in the subframe including the PDCCH and the RLM may be performed based on the ePDCCH in the subframe including the ePDCCH.

Even in the case where the same frequency band is alternately used for the downlink (downlink subframe) and the uplink (uplink subframe) such as the TDD, the UE may perform the RLM based on the PDCCH or the ePDCCH transmitted through the downlink subframe.

In the transmission scheme based on the TDD, the subframe set for transmitting the uplink data transmission through a system information block signal may be originally dynamically or semi-statically changed to the subframe for downlink data transmission. In this case, the UE monitors the ePDCCH or the PDCCH of the changed downlink subframe to acquire the control information.

Figure 32:
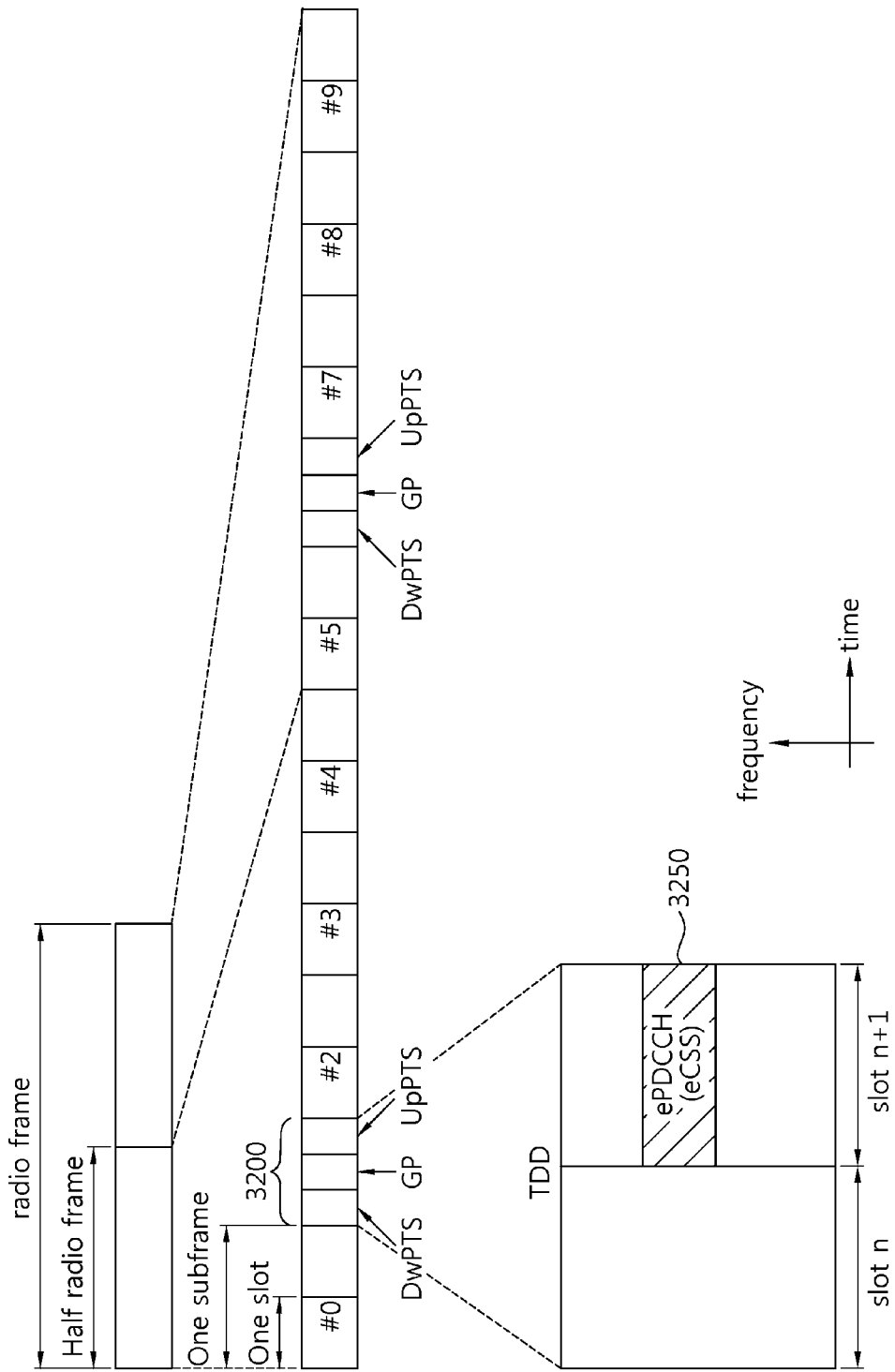
FIG. 32 is a conceptual diagram illustrating a method for monitoring a subframe in a TDD mode frame according to an exemplary embodiment of the present invention.

FIG. 32 is a conceptual diagram illustrating a method for monitoring a subframe in a TDD mode frame according to an exemplary embodiment of the present invention.

Referring to FIG. 32, it is assumed that the subframe 3200 is a subframe in which the uplink subframe is changed to the downlink subframe. A specific limit is given to the subframe 3200, and as a result, the UE may acquire the control information. For example, the UE may acquire the control information based on the an ePDCCH 3250 for the subframe 3200 in which the uplink subframe is changed to the downlink subframe like the subframe 3200.

A limit is given to a subframe that changes a transmission channel, such as the subframe in which the uplink subframe is changed to the downlink subframe so as for the UE to monitor only the ePDCCH data, and as a result, the UE may monitor only the ePDCCH data. Accordingly, the UE may not perform the blind decoding for the PDCCH based on the CRS in the subframe and may not perform additional channel prediction for the PDCCH. That is, the UE may perform RLM based on the ePDCCH 3250 instead of the PDCCH included in the subframe 3200.

Additionally, in a system that may use a part of the uplink subframe for transmitting the DCI, it is assumed that a new ePDCCH which is a new control channel may be transmitted through the uplink subframe and monitoring and blind decoding may be performed for the corresponding control channel.

When it is assumed that the subframe 3200 in which the uplink subframe is or may be changed to the downlink subframe is a downlink change subframe, the downlink change subframe and a subframe other than the downlink change subframe or a normal subframe may be operated in a time division multiplexing (TDM) scheme.

Figure 33:
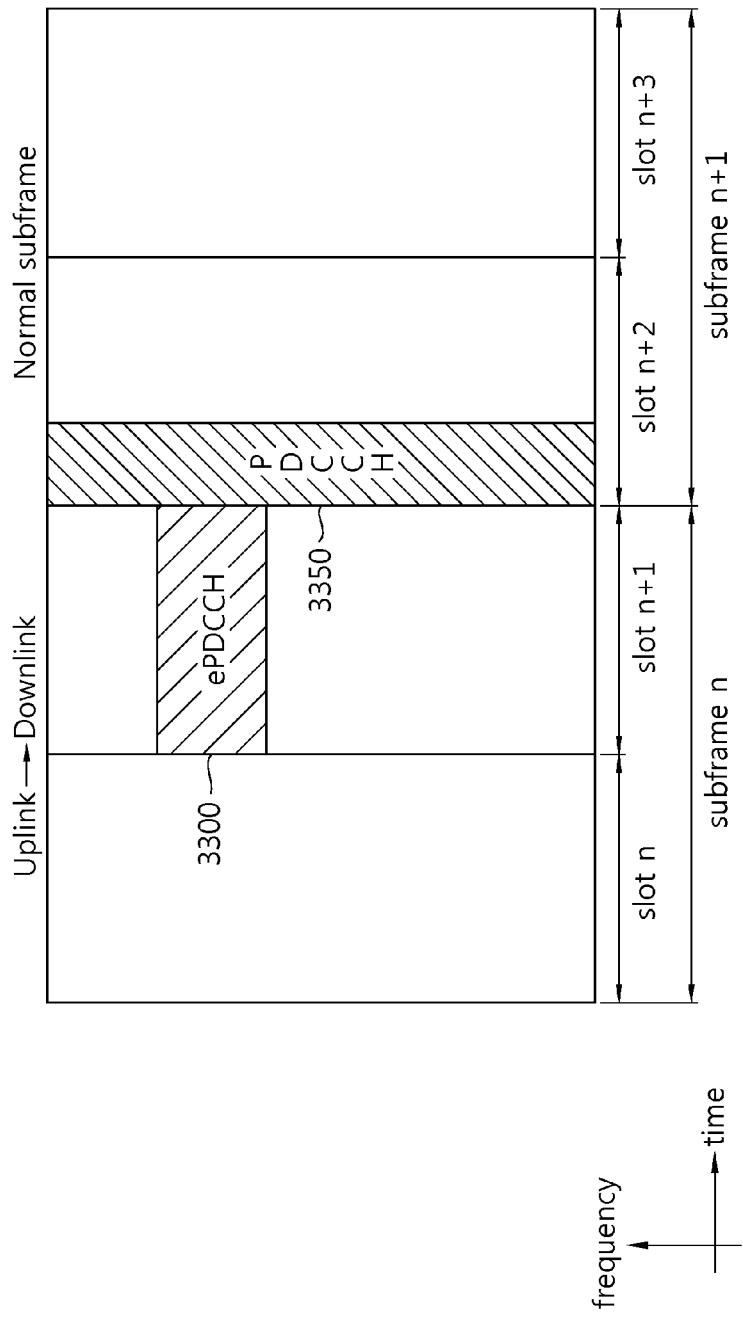
FIG. 33 is a conceptual diagram illustrating a method for transmitting control information to a UE based on time unit channel division according to the exemplary embodiment of the present invention.

FIG. 33 is a conceptual diagram illustrating a method for transmitting control information to a UE based on time unit channel division according to the exemplary embodiment of the present invention.

FIG. 33 illustrates that the first subframe is the downlink change subframe and the second subframe transmitted subsequently to the first subframe is the normal subframe.

The UE may acquire the control information by monitoring an ePDCCH 3300 in the first subframe and acquire the control information by monitoring a PDCCH 3350 in the second subframe.

Figure 34:
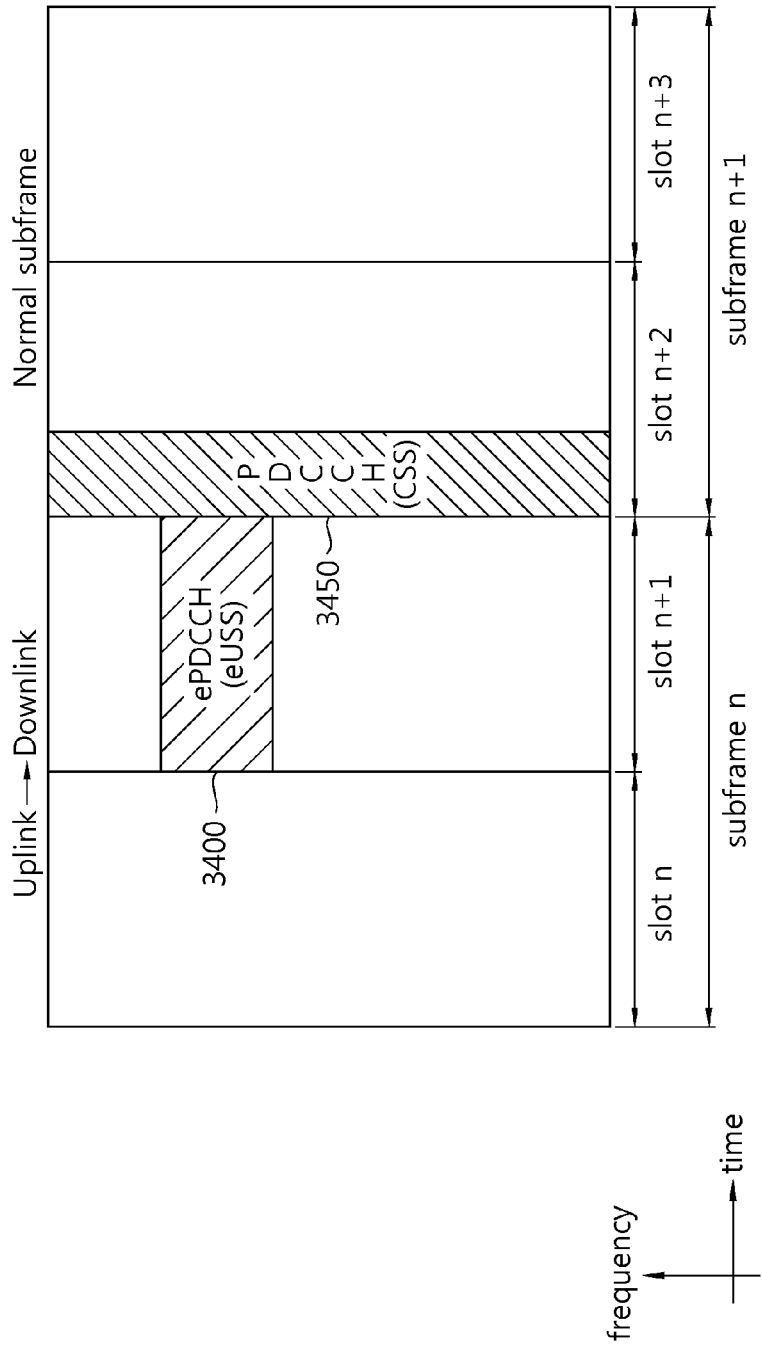
FIG. 34 is a conceptual diagram illustrating a method for transmitting control information to a UE based on time unit channel division according to an exemplary embodiment of the present invention.

FIG. 34 is a conceptual diagram illustrating a method for transmitting control information to a UE based on time unit channel division according to an exemplary embodiment of the present invention.

FIG. 34 illustrates that the first subframe is the downlink change subframe and the subsequent subframe is the normal subframe. In FIG. 34, the eUSS is set and transmitted in an ePDCCH 3400 and the CSS is set and transmitted in a PDCCH 3450 of the normal subframe.

The UE may acquire the control information by monitoring the eUSS of the ePDCCH 3400 in the first subframe and acquire the control information by monitoring the CSS of the PDCCH 3450 in the second subframe.

Figure 35:
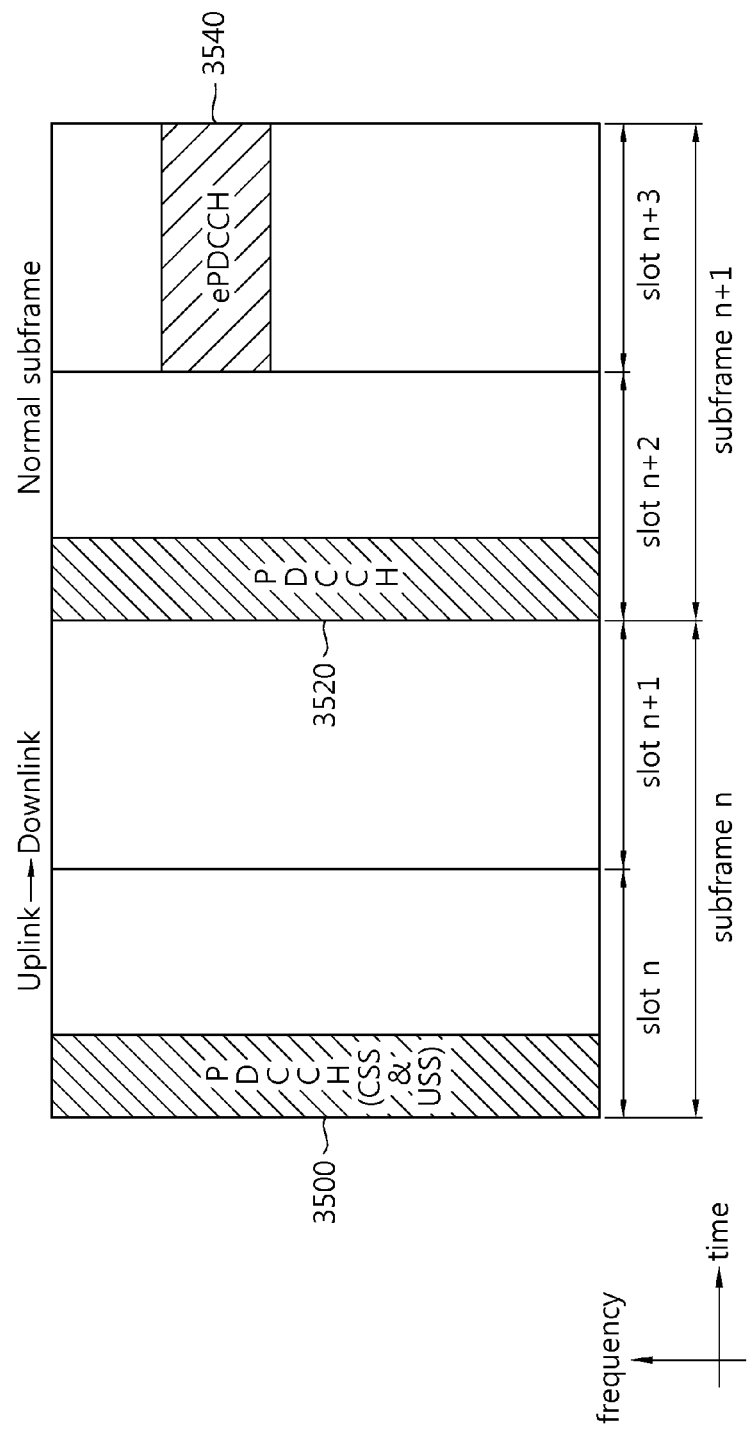
FIG. 35 is a conceptual diagram illustrating a method for transmitting control information to a UE based on time unit channel division according to an exemplary embodiment of the present invention.

FIG. 35 is a conceptual diagram illustrating a method for transmitting control information to a UE based on time unit channel division according to an exemplary embodiment of the present invention.

FIG. 35 illustrates that the first subframe is the downlink change subframe and the subsequent subframe is the normal subframe. In FIG. 35, the ePDCCH is not set in the downlink change subframe and only a PDCCH 3500 is set and transmitted.

The UE may acquire the control information by monitoring the USS and the CSS in the PDCCH 3500 in the first subframe and acquire the control information by monitoring a PDCCH 3520 and/or an ePDCCH 3540 in the second subframe.

Figure 36:
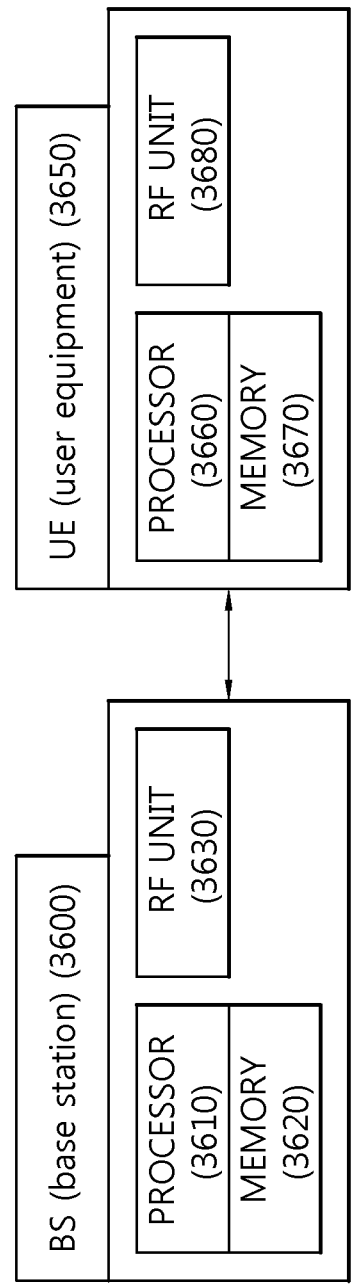
FIG. 36 is a block diagram illustrating a wireless communication system according to an exemplary embodiment of the present invention.

FIG. 36 is a block diagram illustrating a wireless communication system according to an exemplary embodiment of the present invention.

Referring to FIG. 36, the base station 3600 includes a processor 3610, a memory 3620, and a radio frequency (RF) unit 3630. The memory 3620 is connected with the processor 3610 to store various information for driving the processor 3610. The RF unit 3620 is connected with the processor 3610 to transmit and/or receive a radio signal. The processor 3610 implements a function, a process, and/or a method which are proposed. In the aforementioned embodiment, the operation of the base station may be implemented by the processor 3610.

For example, the processor may set the common search space in the PDCCH region or the ePDCCH region and transmit the common search space. When the common search space is present in the ePDCCH region, HARQ (hybrid automatic repeat request) ACK (acknowledgement)/NACK (non-acknowledgement) information may be transmitted through the ePHICH.

A wireless device 3650 includes a processor 3660, a memory 3670, and an RF unit 3680. The memory 3670 is connected with the processor 3660 to store various information for driving the processor 3660. The RF unit 3680 is connected with the processor 3660 to transmit and/or receive a radio signal. The processor 3660 implements a function, a process, and/or a method which are proposed. In the aforementioned embodiment, the operation of the wireless device may be implemented by the processor 3660.

For example, the processor 3660 determines whether the common search space is present in the physical downlink control channel (PDCCH) region or the enhanced physical downlink control channel (ePDCCH) region and when the common search space is present in the physical downlink control channel (PDCCH) region, the processor 3660 may be implemented to monitor the downlink control channel for the HARQ (hybrid automatic repeat request) ACK (acknowledgement)/NACK (non-acknowledgement) information in the ePDCCH region.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for monitoring a downlink control channel by a user equipment (UE) in a wireless communication system, the method comprising:

determining, by the UE, whether a common search space is present in a physical downlink control channel (PDCCH) region or an enhanced physical downlink control channel (ePDCCH) region in a subframe; and monitoring, by the UE, when the common search space is present in the ePDCCH region, a downlink control channel for HARQ (hybrid automatic repeat request) ACK (acknowledgement)/NACK (non-acknowledgement) information in the ePDCCH region, wherein the monitoring includes:

monitoring, by the UE, the ePDCCH based on a first candidate position in the common search space; and monitoring, by the UE, the HARQ ACK/NACK based on a second candidate position in the common search space, and wherein the first candidate position represents a start point of a resource region in which blind decoding is performed, wherein the common search space is present at a fixed position in the PDCCH region or the ePDCCH region in all subframes, wherein the PDCCH region is a region in which a PDCCH is monitored based on a cell-specific reference signal (CRS) in the subframe, wherein the CRS is a reference signal created based on a cell identifier, wherein the ePDCCH region is a region in which an ePDCCH is monitored based on a demodulation reference signal (DM-RS) in the subframe, wherein the DM-RS is a reference signal created based on a value given by a base station, and wherein the downlink control channel transports the HARQ ACK/NACK information for a plurality of UEs.

2. The method of claim 1, wherein the monitoring of the downlink channel further includes:

monitoring, by the UE, the ePDCCH based on a first control channel element (CCE) aggregation level in the common search space; and monitoring, by the UE, the HARQ ACK/NACK based on a second CCE aggregation level in the common search space, and wherein the CCE aggregation level represents a unit of the resource region in which the blind decoding is performed.

3. The method of claim 1, further comprising:

monitoring, when the common search space is present in the PDCCH region, the downlink control channel for the HARQ ACK/NACK information in the PDCCH region.

4. The method of claim 3, further comprising:

determining whether the common search space of the PDCCH is present as a threshold value or more; and measuring channel status information based on the CRS when the common search space of the PDCCH is present as the threshold value or more.

5. The method of claim 4, further comprising:

measuring the channel status information based on the DM-RS when the common search space of the PDCCH is present as a value less than the threshold value.

6. A user equipment (UE) for monitoring a downlink control channel in a wireless communication system, the UE comprising:

a processor, wherein the processor is configured to:

determine whether a common search space is present in a physical downlink control channel (PDCCH) region or an enhanced physical downlink control channel (ePDCCH) region in a subframe, and monitor, when the common search space is present in the ePDCCH region, a downlink control channel for HARQ (hybrid automatic repeat request) ACK (acknowledgement)/NACK (non-acknowledgement) information in the ePDCCH region by monitoring the ePDCCH based on a first candidate position in the common search space, and monitoring the HARQ ACK/NACK based on a second candidate position in the common search space, and wherein the first candidate position represents a start point of a resource region in which blind decoding is performed, wherein the common search space is present at a fixed position in the PDCCH region or the ePDCCH region in all subframes, wherein the PDCCH region is a region in which a PDCCH is monitored based on a cell-specific reference signal (CRS) in the subframe, wherein the CRS is a reference signal created based on a cell identifier, wherein the ePDCCH region is a region in which an ePDCCH is monitored based on a demodulation reference signal (DM-RS) in the subframe, wherein the DM-RS is a reference signal created based on a value given by a base station, and wherein the downlink control channel transports the HARQ ACK/NACK information for a plurality of UEs.

7. The UE of claim 6, wherein the processor is further configured to monitor the downlink control channel by monitoring the ePDCCH based on a first control channel element (CCE) aggregation level in the common search space, and monitoring HARQ ACK/NACK based on a second CCE aggregation level in the common search space, and wherein the CCE aggregation level represents a unit of the resource region in which the blind decoding is performed.

8. The UE of claim 6, wherein the processor is further configured to monitor the downlink control channel for the HARQ ACK/NACK information in the PDCCH region when the common search space is present in the PDCCH region.

9. The UE of claim 8, wherein the processor is further configured to determine whether the common search space of the PDCCH is present as a threshold value or more and measure a channel status information based on the CRS when the common search space of the PDCCH is present as the threshold value or more.

10. The UE of claim 9, wherein the processor is further configured to measure the channel status information based on the DM-RS when the common search space of the PDCCH is present as a value less than the threshold value.

* * * * *